(12) United States Patent
Qian et al.

(10) Patent No.: US 12,309,528 B2
(45) Date of Patent: May 20, 2025

(54) SCREEN SHARING METHOD, TERMINAL, AND STORAGE MEDIUM

(71) Applicant: Huawei Technologies Co., Ltd., Shenzhen (CN)

(72) Inventors: Kai Qian, Shenzhen (CN); Jinpeng Zhu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 162 days.

(21) Appl. No.: 18/004,592

(22) PCT Filed: Jul. 5, 2021

(86) PCT No.: PCT/CN2021/104544
§ 371 (c)(1),
(2) Date: Jan. 6, 2023

(87) PCT Pub. No.: WO2022/007750
PCT Pub. Date: Jan. 13, 2022

(65) Prior Publication Data
US 2023/0254445 A1    Aug. 10, 2023

(30) Foreign Application Priority Data
Jul. 8, 2020   (CN) .......................... 202010650598.4

(51) Int. Cl.
*H04N 7/15*     (2006.01)
*G06F 3/04845*  (2022.01)
*G06F 3/14*     (2006.01)

(52) U.S. Cl.
CPC .......... *H04N 7/15* (2013.01); *G06F 3/04845* (2013.01); *G06F 3/1454* (2013.01)

(58) Field of Classification Search
CPC ............................... H04N 7/15; G06F 3/1454
See application file for complete search history.

(56) References Cited

U.S. PATENT DOCUMENTS

| 9,319,229 B2* | 4/2016 | Kato ................... H04L 12/1827 |
| 10,609,333 B2* | 3/2020 | Leatherman, III .......................... H04L 12/1822 |
| 2013/0080616 A1 | 3/2013 | Tsui et al. |
| 2016/0373693 A1* | 12/2016 | Segal ..................... H04N 21/47 |
| 2018/0285054 A1 | 10/2018 | Kim |
| 2019/0260966 A1 | 8/2019 | Leatherman, III |

FOREIGN PATENT DOCUMENTS

| CN | 102883135 B | 8/2015 |
| CN | 108235111 A | 6/2018 |
| WO | 2012170118 A1 | 12/2012 |

* cited by examiner

*Primary Examiner* — Amal S Zenati
(74) *Attorney, Agent, or Firm* — Slater Matsil, LLP

(57) ABSTRACT

Embodiments of this application relate to the field of intelligent terminals, and provide a screen sharing method, a terminal, and a storage medium. In the method, a first local terminal sends a first shared picture of the first local terminal to a peer terminal. The first local terminal receives a second shared picture of the peer terminal that is sent by the peer terminal. The first local terminal receives a third shared picture of a second local terminal that is sent by the second local terminal. The first local terminal sends the third shared picture to the peer terminal. The first local terminal displays a first interface, where the first interface includes at least the second shared picture.

20 Claims, 13 Drawing Sheets

SCREEN SHARING METHOD, TERMINAL, AND STORAGE MEDIUM

CROSS-REFERENCE TO RELATED APPLICATIONS

This application is a national stage of International Application No. PCT/CN2021/104544, filed on Jul. 5, 2021, which claims priority to Chinese Patent Application No. 202010650598.4, filed on Jul. 8, 2020. Both of the aforementioned applications are hereby incorporated by reference in their entireties.

TECHNICAL FIELD

Embodiments of this application relate to the field of intelligent terminal technologies, and in particular, to a screen sharing method, a terminal, and a storage medium.

BACKGROUND

With the continuous development of information technologies, a network has become an important means of information propagation. In a new interaction manner based on remote control and operation interaction, a user can implement same interaction and remotely perform viewing and operations without having to be present. In particular, with the popularization of intelligent terminals, people can perform a multi-party video call more conveniently by using a video conference.

Currently, when both parties share a screen, information about the screen and information collected by a video device may be generally shared. For example, a user A may perform a video call with a user B, but if a third party needs to join the video call in this case, and screen information of the third party is displayed on a screen of either of the two users, the user A or the user B needs to collect the screen information of the third party by using the video device. Consequently, a picture may shake, a video is unclear, operation efficiency is low, and user experience is reduced.

SUMMARY

Embodiments of this application provide a screen sharing method and a terminal. This application further provides a computer-readable storage medium, to provide an efficient screen sharing manner, so that a plurality of local terminal devices can share screens with a peer device. In this way, screen sharing convenience can be improved.

According to a first aspect, an embodiment of this application provides a screen sharing method, including:

A first local terminal sends a first shared picture of the first local terminal to a peer terminal; the first local terminal receives a second shared picture of the peer terminal that is sent by the peer terminal; the first local terminal receives a third shared picture of a second local terminal that is sent by the second local terminal; and the first local terminal sends the third shared picture to the peer terminal. Specifically, the first local terminal, the second local terminal, and the peer terminal may be mobile terminals, personal computers, smart screens, or other multimedia terminals with a same function. After a data transmission channel is established between the first local terminal and the peer terminal, the first local terminal may send the first shared picture to the peer terminal, and the peer terminal may send the second shared picture to the first local terminal. After a data transmission channel is established between the first local terminal and the second local terminal, the second local terminal may send the third shared picture to the first local terminal, and the first local terminal may further forward the third shared picture to the peer terminal.

The first local terminal displays a first interface, and the first interface includes at least the second shared picture. The first local terminal is connected to the peer terminal by using a communication network, the first local terminal is directly connected to the second local terminal, a second interface displayed on the peer terminal includes the first shared picture and the third shared picture, and the first shared picture does not include the third shared picture. Specifically, the second shared picture of the peer terminal may be displayed on a display interface of the first local terminal, and the third shared picture of the second local terminal may be further displayed on the display interface of the first local terminal; and the first shared picture of the first local terminal and the third shared picture of the second local terminal may be displayed on a display interface of the peer terminal. If the display interface of the first local terminal includes the third shared picture, the first shared picture on the display interface of the peer terminal does not include the third shared picture. A direct connection between the first local terminal and the second local terminal may be a direct connection in a local network. For example, the first local terminal and the second local terminal may be in a same local network, and a point-to-point connection such as a Wi-Fi direct connection, a Bluetooth direct connection, or an infrared direct connection may be established between the first local terminal and the second local terminal. A communication network connection between the first local terminal and the peer terminal may be a connection established by using an internet. In other words, a communication network connection is established between the first local terminal and the peer terminal in an external network.

In a possible implementation, the method further includes:

The first local terminal receives a first operation in which a user selects the second local terminal from a plurality of local terminals, where specifically, the first operation may be an operation performed by the user on a display of a local primary terminal, and the operation may be used to select the second local terminal; and the first local terminal sends a sharing request to the second local terminal in response to the first operation, so that the second local terminal sends the third shared picture to the first local terminal after establishing the direct connection to the first local terminal based on the sharing request, where specifically, the first local terminal may select one or more second local terminals as a to-be-shared screen sharing device in this time, and may send a request to the selected second local terminal, so that the second local terminal may establish the direct connection to the first local terminal, and send the third shared picture to the first local terminal after establishing the direct connection.

In a possible implementation, the method further includes:

The first local terminal receives a sharing request sent by the second local terminal, and establishes the direct connection to the second local terminal based on the sharing request, so that the second local terminal sends the third shared picture to the first local terminal after the direct connection is established to the first local terminal. Specifically, the second local terminal may actively initiate the request. For example, the second local terminal may actively initiate the request to the first local terminal in a near field communication (Near Field Communication, NFC) manner or in a manner of shaking the second local terminal, so that the second local terminal sends the third shared picture to the first local terminal after the direct connection is established to the first local terminal.

In a possible implementation, the method further includes:

The first interface further includes the third shared picture, or the first interface does not include the third shared picture. Specifically, the first local terminal receives video encoding information of the second local terminal, may decode and render the video encoding information of the second local terminal, generate the third shared picture of the second local terminal, and may display the third shared picture on a display of the first local terminal, that is, the first interface. After receiving the video encoding information of the second local terminal, the first local terminal may alternatively directly forward the video encoding information of the second local terminal to the peer terminal, that is, the first local terminal does not decode or render the video encoding information of the second local terminal. In other words, the third shared picture is not displayed on the first interface of the first local terminal, but the peer terminal decodes and renders the video encoding information of the second local terminal, and displays the third shared picture on the second interface of the peer terminal.

In a possible implementation, the method further includes:

The first interface further includes the first shared picture, or the first interface does not include the first shared picture. Specifically, the first shared picture corresponding to the first local terminal may be displayed on the first interface of the first local terminal, or the first shared picture corresponding to the first local terminal may not be displayed on the first interface of the first local terminal.

In a possible implementation, if the communication network connection between the first local terminal and the peer terminal does not meet a preset transmission condition, the method further includes:

The first local terminal disconnects the communication network connection to the peer terminal; and the first local terminal sends the first shared picture to the second local terminal, so that the second local terminal sends the first shared picture and the third shared picture to the peer terminal, where the second local terminal is connected to the peer terminal by using the communication network, a third interface of the second local terminal includes at least the second shared picture, the second interface displayed on the peer terminal includes the first shared picture and the third shared picture, and the third shared picture does not include the first shared picture.

In a possible implementation, the method further includes:

The first local terminal receives a second operation in which a user adjusts a parameter of the third shared picture, where specifically, the second operation may be an operation performed by the user on a local primary terminal, and the second operation may be used to change a display parameter corresponding to the third shared picture; and the first local terminal sends a picture parameter adjustment request to the second local terminal in response to the second operation, so that the second local terminal sends the third shared picture to the first local terminal after adjusting the third shared picture based on the picture parameter adjustment request.

According to a second aspect, an embodiment of this application provides a first local terminal, including:

a first sending module, configured to send a first shared picture of the first local terminal to a peer terminal by the first local terminal;

a first receiving module, configured to receive, by the first local terminal, a second shared picture of the peer terminal that is sent by the peer terminal;

a second receiving module, configured to receive, by the first local terminal, a third shared picture of a second local terminal that is sent by the second local terminal;

a second sending module, configured to send the third shared picture to the peer terminal by the first local terminal; and a display module, configured to display a first interface by the first local terminal, where the first interface includes at least the second shared picture, the first local terminal is connected to the peer terminal by using a communication network, the first local terminal is directly connected to the second local terminal, a second interface displayed on the peer terminal includes the first shared picture and the third shared picture, and the first shared picture does not include the third shared picture.

In a possible implementation, the first local terminal further includes:

a request module, configured to: receive, by the first local terminal, a first operation in which a user selects the second local terminal from a plurality of local terminals, and send, by the first local terminal, a sharing request to the second local terminal in response to the first operation, so that the second local terminal sends the third shared picture to the first local terminal after establishing a direct connection to the first local terminal based on the sharing request.

In a possible implementation, the first local terminal further includes:

a connection module, configured to: receive, by the first local terminal, a sharing request sent by the second local terminal, and establish the direct connection to the second local terminal based on the sharing request, so that the second local terminal sends the third shared picture to the first local terminal after the direct connection is established to the first local terminal.

In a possible implementation, the first interface further includes the third shared picture, or the first interface does not include the third shared picture.

In a possible implementation, the first interface further includes the first shared picture, or the first interface does not include the first shared picture.

In a possible implementation, the first local terminal further includes:

a disconnection module, configured to disconnect the communication network connection to the peer terminal by the first local terminal; and a third sending module, configured to send the first shared picture to the second local terminal by the first local terminal, so that the second local terminal sends the first shared picture and the third shared picture to the peer terminal, where the second local terminal is connected to the peer terminal by using the communication network, a third interface of the second local terminal includes at least the second shared picture, the second interface displayed on the peer terminal includes the first shared picture and the third shared picture, and the third shared picture does not include the first shared picture.

In a possible implementation, the first local terminal further includes:

an adjustment module, configured to: receive, by the first local terminal, a second operation in which a user adjusts a parameter of the third shared picture, and send, by the first local terminal, a picture parameter adjustment request to the second local terminal in response to the second operation, so that the second local terminal sends the third shared picture to the first local terminal after adjusting the third shared picture based on the picture parameter adjustment request.

According to a third aspect, an embodiment of this application provides a first local terminal, including:

a display, one or more processors, a memory, a plurality of applications, and one or more computer programs, where the one or more computer programs are stored in the memory, the one or more computer programs include instructions, and when the instructions are executed by the first local terminal, the first local terminal is enabled to perform the following steps: the first local terminal sends a first shared picture of the first local terminal to a peer terminal; the first local terminal receives a second shared picture of the peer terminal that is sent by the peer terminal; the first local terminal receives a third shared picture of a second local terminal that is sent by the second local terminal; the first local terminal sends the third shared picture to the peer terminal; and the first local terminal displays a first interface, where the first interface includes at least the second shared picture, the first local terminal is connected to the peer terminal by using a communication network, the first local terminal is directly connected to the second local terminal, a second interface displayed on the peer terminal includes the first shared picture and the third shared picture, and the first shared picture does not include the third shared picture.

In a possible implementation, when the instructions are executed by the first local terminal, the first local terminal is further enabled to perform the following steps: the first local terminal receives a first operation in which a user selects the second local terminal from a plurality of local terminals; and the first local terminal sends a sharing request to the second local terminal in response to the first operation, so that the second local terminal sends the third shared picture to the first local terminal after establishing a direct connection to the first local terminal based on the sharing request.

In a possible implementation, when the instructions are executed by the first local terminal, the first local terminal is further enabled to perform the following step: the first local terminal receives a sharing request sent by the second local terminal, and establishes the direct connection to the second local terminal based on the sharing request, so that the second local terminal sends the third shared picture to the first local terminal after the direct connection is established to the first local terminal.

In a possible implementation, the first interface further includes the third shared picture, or the first interface does not include the third shared picture.

In a possible implementation, the first interface further includes the first shared picture, or the first interface does not include the first shared picture.

In a possible implementation, when the instructions are executed by the first local terminal, the first local terminal is further enabled to perform the following steps: the first local terminal disconnects the communication network connection to the peer terminal; and the first local terminal sends the first shared picture to the second local terminal, so that the second local terminal sends the first shared picture and the third shared picture to the peer terminal, where the second local terminal is connected to the peer terminal by using the communication network, a third interface of the second local terminal includes at least the second shared picture, the second interface displayed on the peer terminal includes the first shared picture and the third shared picture, and the third shared picture does not include the first shared picture.

In a possible implementation, when the instructions are executed by the first local terminal, the first local terminal is further enabled to perform the following steps:

the first local terminal receives a second operation in which a user adjusts a parameter of the third shared picture; and the first local terminal sends a picture parameter adjustment request to the second local terminal in response to the second operation, so that the second local terminal sends the third shared picture to the first local terminal after adjusting the third shared picture based on the picture parameter adjustment request.

It should be understood that technical solutions in the second and the third aspects of this application are consistent with technical solutions of the first aspect of this application, and beneficial effects obtained in the aspects and corresponding feasible implementations are similar, and are not described again.

According to a fourth aspect, this application provides a computer-readable storage medium. The computer-readable storage medium stores a computer program, and when the computer program is run on a computer, the computer is enabled to perform the method in the first aspect.

According to a fifth aspect, this application provides a computer program. When the computer program is executed by a computer, the computer is configured to perform the method in the first aspect.

In a possible design, the program in the fifth aspect may be entirely or partially stored in a storage medium packaged with a processor, or may be partially or entirely stored in a memory that is not packaged with the processor.

DETAILED DESCRIPTION OF ILLUSTRATIVE EMBODIMENTS

Terms used in embodiments of this application are only used to explain specific embodiments of this application, but are not intended to limit this application.

In an existing implementation solution, when two users perform a video call, if screen information of a third-party device is to be shared, the screen information of the third-party device may be collected by using a video device of one of the two users, so that the screen information of the third-party device is shared on device interfaces of the two users. However, in the foregoing scenario, due to instability of the video device, a collected video picture is unstable, and communication experience between the two users is poor.

Therefore, an embodiment of this application proposes a screen sharing method, so that screen information of a third party can be effectively shared between a local terminal device and a peer device, and operation convenience of screen sharing and user experience are improved.

Figure 1A:
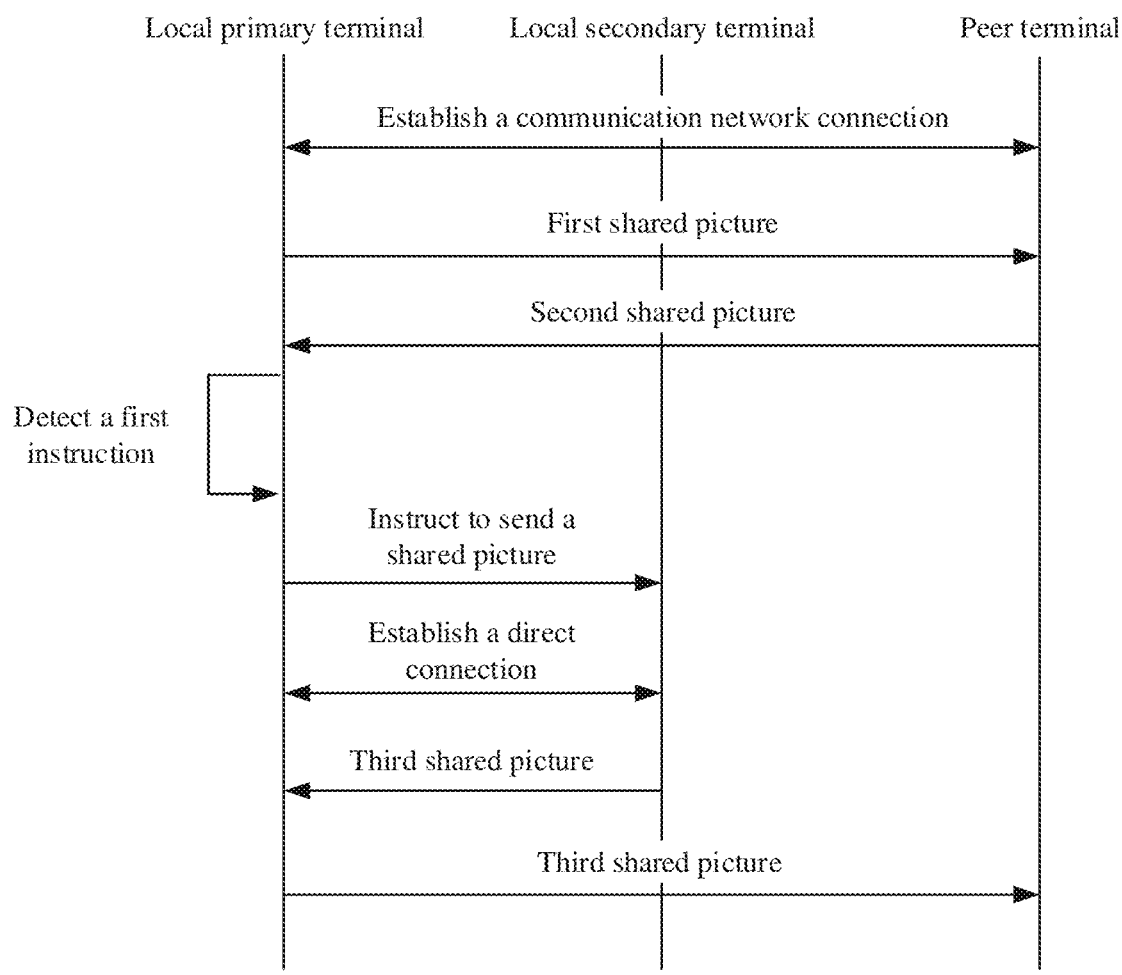
FIG. 1A is a flowchart of an embodiment of a screen sharing method in this application.

The screen sharing method in this application is described with reference to FIG. 1 to FIG. 6. FIG. 1A is a flowchart of an embodiment of the screen sharing method in this application. As shown in FIG. 1A, the screen sharing method may include the following steps.

Step 101: A local primary terminal establishes a communication network connection to a peer terminal, and the local primary terminal establishes a direct connection to a local secondary terminal.

Specifically, the local primary terminal and the local secondary terminal may be in a same local network. Therefore, the local primary terminal and the local secondary terminal may be locally connected in the local network. The local connection may include a direct connection and a local interconnection. The direct connection may be a point-to-point connection between local terminals. For example, the direct connection may be a Wi-Fi direct connection, a Bluetooth direct connection, or an infrared direct connection. The local interconnection may be an interconnection between local terminals by using an intermediate device. For example, the intermediate device may be a gateway device such as a router or a switch.

The peer terminal and the local terminal may not be in a same local network. Therefore, the peer terminal may establish a communication network connection to the local primary terminal. The communication network connection may be a connection established by using an internet; in other words, the local primary terminal is connected to the peer terminal in an external network by using an internet device such as a router or a server.

The local network may be a local area network, and the local area network may be one of or a combination of a plurality of a bus type, a ring type, a star type, and a tree type. The local area network may include a plurality of local terminals. The local terminal may be a smart TV, a smartphone, or another intelligent terminal device or a multimedia terminal device that has a display. The peer terminal may be a terminal device that is the same as the local terminal.

It should be noted that any local terminal in the local network may establish a communication network connection to the peer terminal, and the communication network connection may be a communication channel that includes voice, a video, or another data connection. For example, after the local terminal establishes the communication network connection to the peer terminal, a video call may be performed. Screens of both parties may display information and/or video collection information of the other party, the screen information may include picture information of the display, and the video collection information may include information collected by a video collection device, for example, video information obtained by a camera. When the local primary terminal and the peer terminal share only the screen information or the video collection information, only the shared screen information or the video collection information is displayed on the display interfaces of both parties. When the local primary terminal and the peer terminal share both the screen information and the video collection information, display interfaces of both parties may display both the shared screen information and the video collection information.

For ease of description, a local terminal to which the communication network connection is established to the peer terminal is identified as a local primary terminal below, and another local terminal located in a same local area network as the local primary terminal is identified as a local secondary terminal. Screen information of the local secondary terminal may be shared on a screen of the peer terminal. For ease of description, a local secondary terminal to which a local connection is established to the local primary terminal and that shares a screen is identified as a screen sharing device below. Sharing the screen information may include: sharing a display picture of the screen sharing device.

It should be noted that the local secondary terminal in the local network may change. For example, a local secondary terminal may be added, deleted, or replaced in the local network. After the local secondary terminal is added in the local network, screen information of the added local secondary terminal may be shared by using an operation of a user.

Figure 2A:
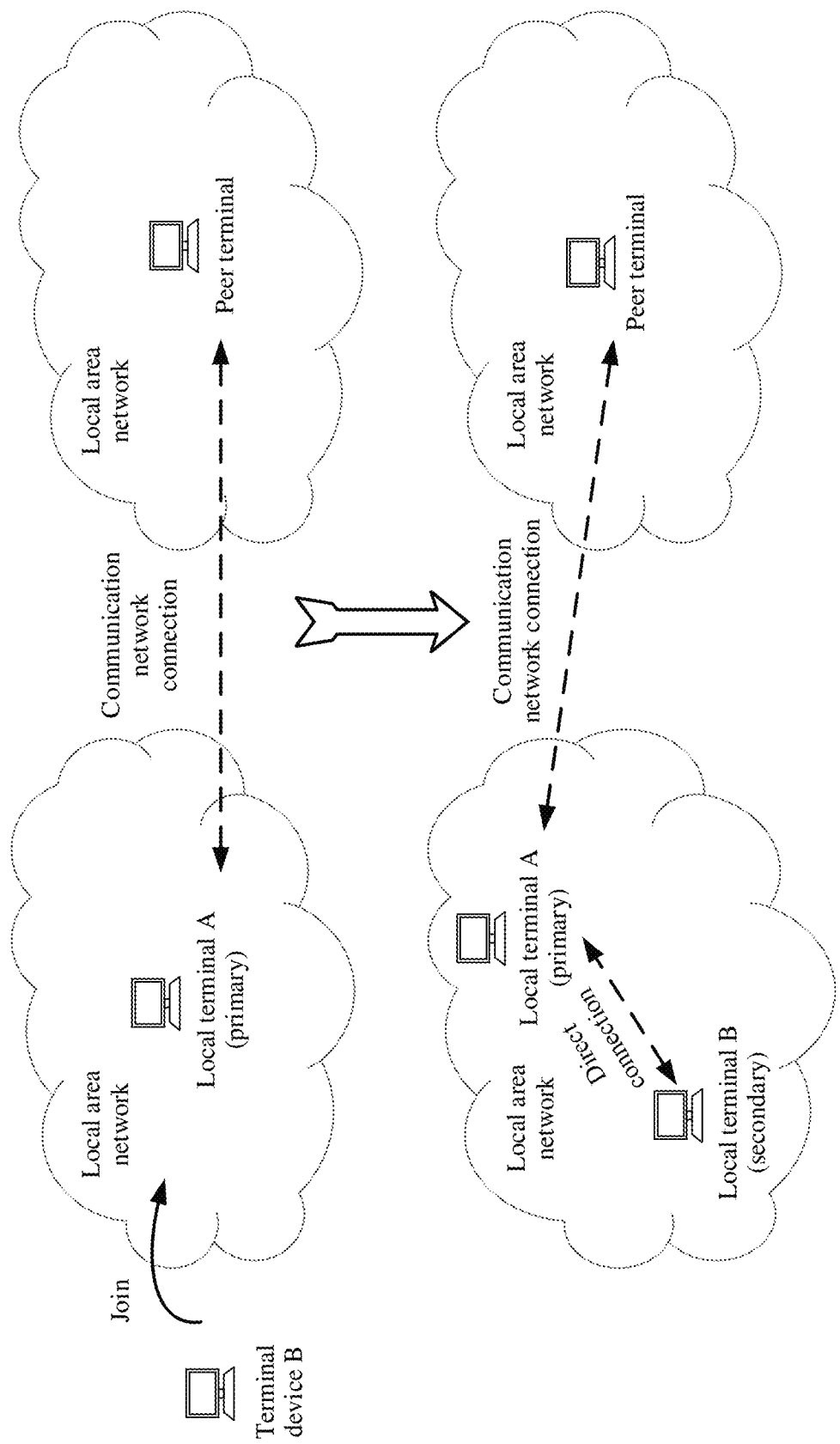
FIG. 2A to FIG. 2C each are a schematic diagram of a network architecture of a local terminal according to an embodiment of this application.
Figure 2B:
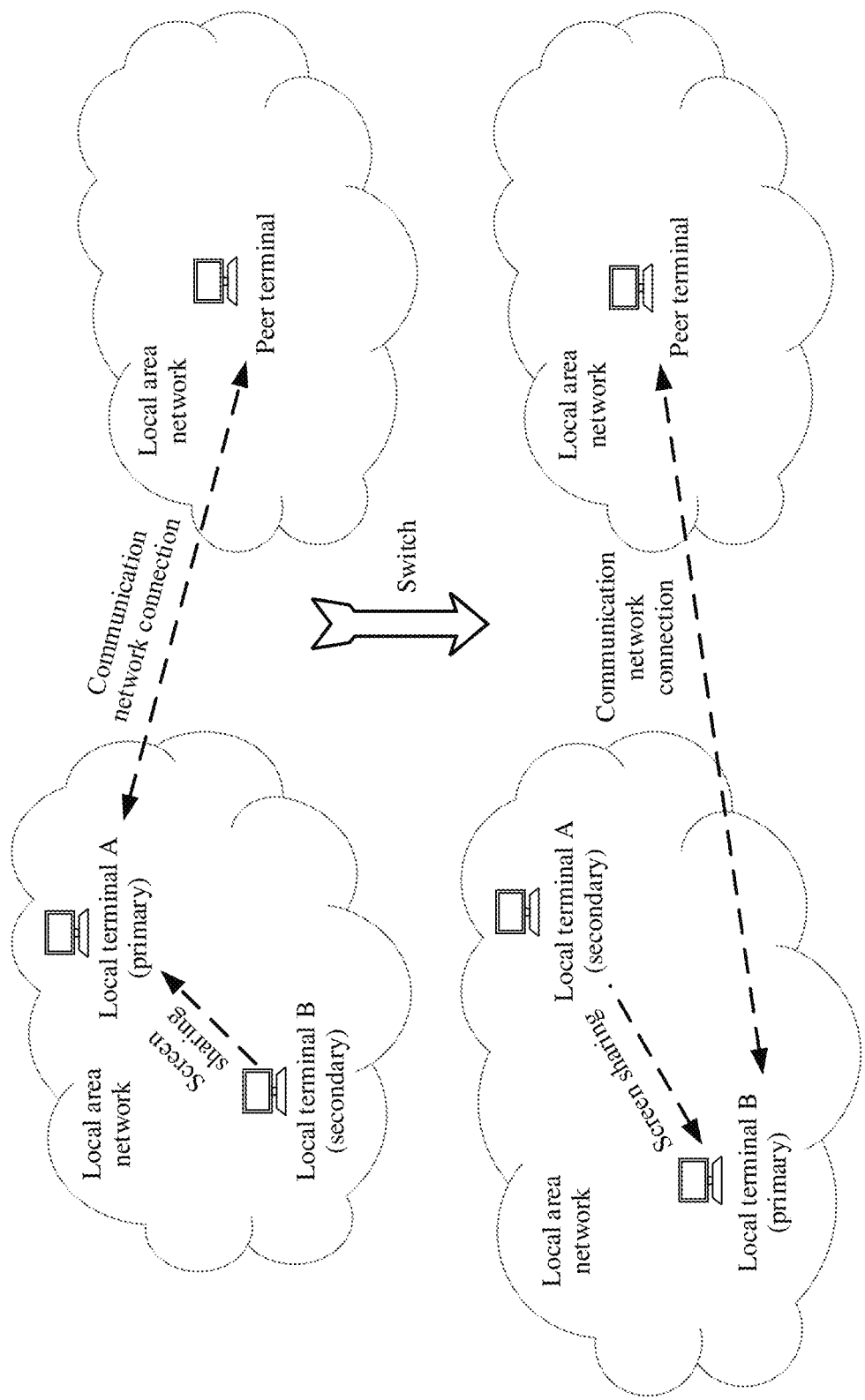
Figure 2C:
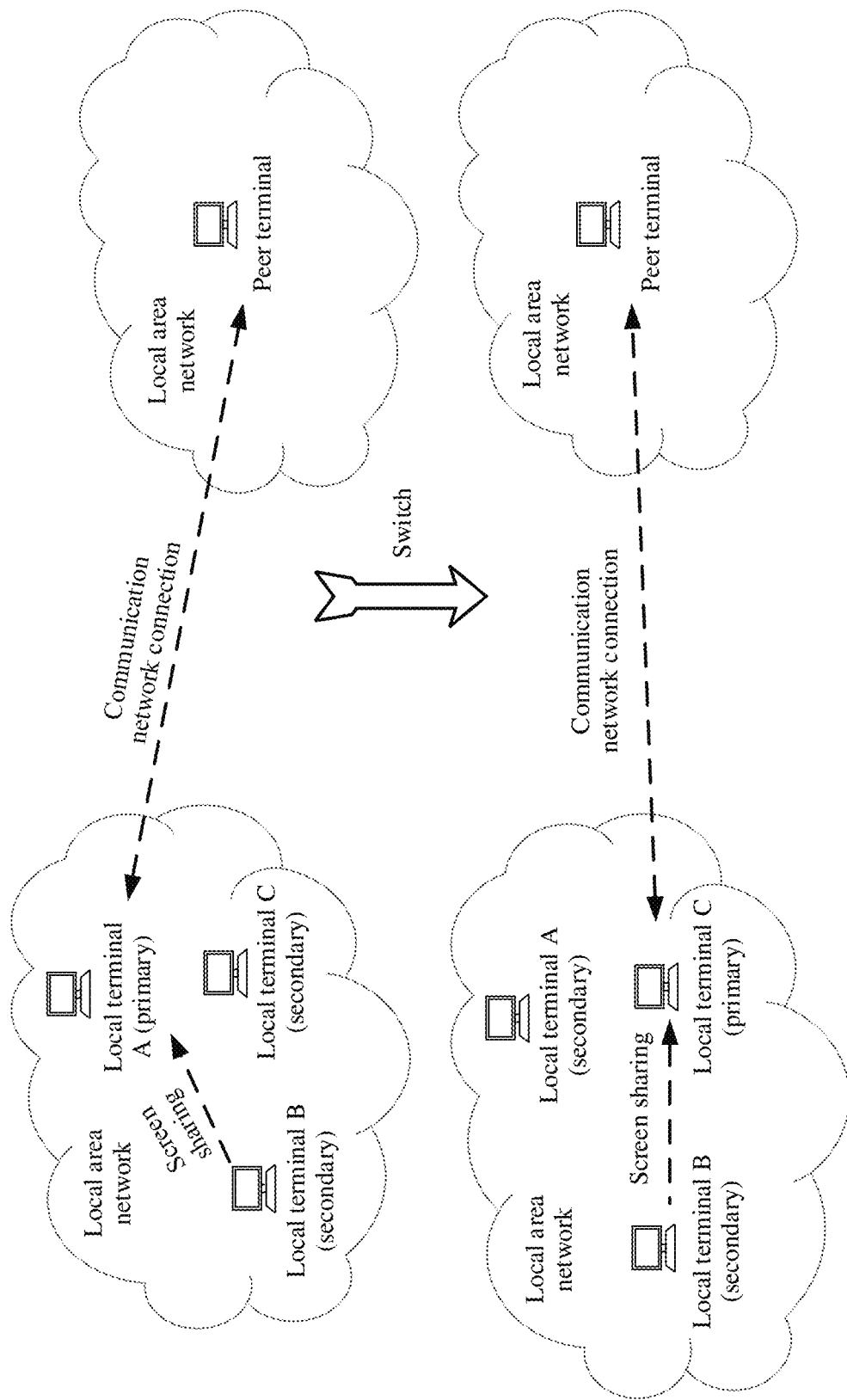

Descriptions are provided with reference to FIG. 2A to FIG. 2C. As shown in FIG. 2A, a local area network includes a local terminal A, and a peer terminal and the local terminal A are not in a same local area network. First, the local terminal A may establish a communication network connection to the peer terminal. In this case, the local terminal A may be identified as the local terminal A (primary). Then, a terminal device B joins the local area network in which the local terminal A is located, and after the terminal device B joins the local area network, the terminal device B may be identified as the local terminal B (secondary).

Optionally, due to reasons such as a network or a device, communication quality between the local primary terminal and the peer terminal may be poor. In this case, the local primary terminal may be switched. For example, any other local secondary terminal is selected as a new local primary terminal. As shown in FIG. 2B, a communication network connection has been established between the local terminal A and the peer terminal. In this case, the local terminal A may be identified as the local terminal A (primary). Screen information of the local terminal B is shared on the peer terminal, and the local terminal B may be identified as a screen sharing device B. If communication between the local terminal A (primary) and the peer terminal is not smooth, the local terminal A (primary) may disconnect the communication network connection to the peer terminal. In this case, the peer terminal may establish a communication network connection to the screen sharing device B. In this way, the local primary terminal may be switched from the local terminal A to the screen sharing device B, the screen sharing device B may be identified as the local terminal B (primary), the local terminal A is identified as the local terminal A (secondary), and screen information of the local terminal A (secondary) may be shared on the peer terminal by using the local terminal B (primary). In this way, convenience of sharing the screen information can be improved. As shown in FIG. 2C, if communication between the local terminal A (primary) and the peer terminal is not smooth, the local primary terminal may further be switched from the local terminal A to a local terminal C. In this case, the peer terminal may establish a communication network connection with the local terminal C, and may identify the local terminal C as the local terminal C (primary), and identify the local terminal A as the local terminal A (secondary), and screen information of the local terminal B (secondary) may be shared on the peer terminal by using the local terminal C (primary). In this way, convenience of sharing the screen information can be improved.

Step 102: Detect a first instruction that is used to enable the local secondary terminal to share a screen.

Specifically, the first instruction may be used to locally determine a screen sharing device from the local secondary terminal, to enable the screen sharing device to send screen information, so that the screen information of the screen sharing device can be shared on the peer terminal.

The first instruction may be initiated by the local primary terminal. In specific implementation, the local primary terminal may receive an operation of the user, and the local primary terminal may display a candidate interface of the local secondary terminal in response to the operation. The user may select one or more local secondary terminals from the candidate interface as screen sharing devices, so that the local primary terminal may generate the first instruction, and the first instruction may include device identifiers of the selected one or more local secondary terminals. For example, the candidate interface of the local secondary terminal may be obtained by taping a key on a screen of the local primary terminal by the user or by performing gesture sliding by the user. It should be noted that all local secondary terminals or some local secondary terminals may be displayed on the candidate interface of the local secondary terminal. The user may select, as screen sharing devices, any one or more local secondary terminals from the local secondary terminals displayed on the candidate interface.

Optionally, the first instruction may alternatively be initiated by the local secondary terminal, and the first instruction may be used to initiate a screen sharing request to the local primary terminal, so that the screen information of the local secondary terminal may be shared on the peer terminal.

In specific implementation, the local secondary terminal may receive an operation of the user, and the local secondary terminal may display a candidate interface of the local primary terminal in response to the operation. The user may select one or more local terminals from the candidate interface as local primary terminals, so that the local secondary terminal may generate the first instruction, and the first instruction may include device identifiers of the selected one or more local primary terminals. For example, the candidate interface of the local primary terminal may be obtained by taping a key on a screen of the local secondary terminal by the user or by performing gesture sliding by the user. It should be noted that all local terminals or some local terminals may be displayed on the candidate interface of the local primary terminal. The user may select, as local primary terminals, one or more local terminals from the local terminals displayed on the candidate interface of the local primary terminal.

Optionally, the user may alternatively hold any local secondary terminal to perform short-range sensing with the local primary terminal, so that the local secondary terminal generates the first instruction, and sends the first instruction to the local primary terminal. For example, the local secondary terminal may select the local primary terminal and may be directly connected to the local primary terminal in a near field communication (Near Field Communication, NFC) manner or in a manner of shaking the local secondary terminal, and screen information is sent after a direct connection is established.

Figure 3A:
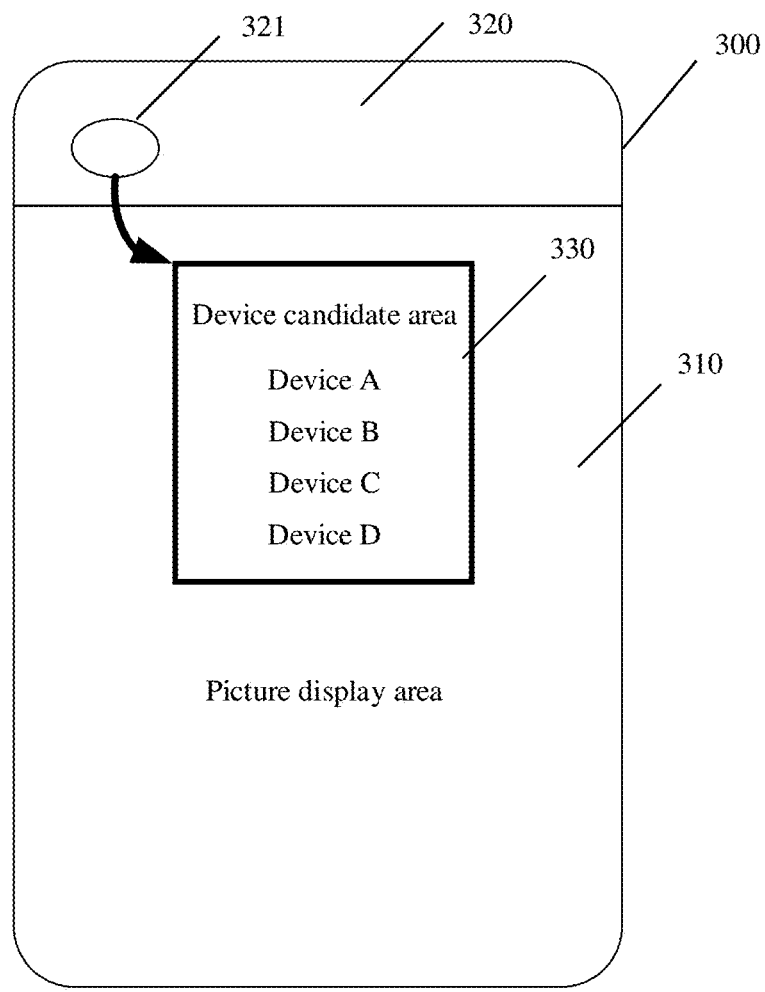
FIG. 3A and FIG. 3B each are a schematic diagram of an embodiment of a display interface of a local primary terminal according to this application.
Figure 3B:
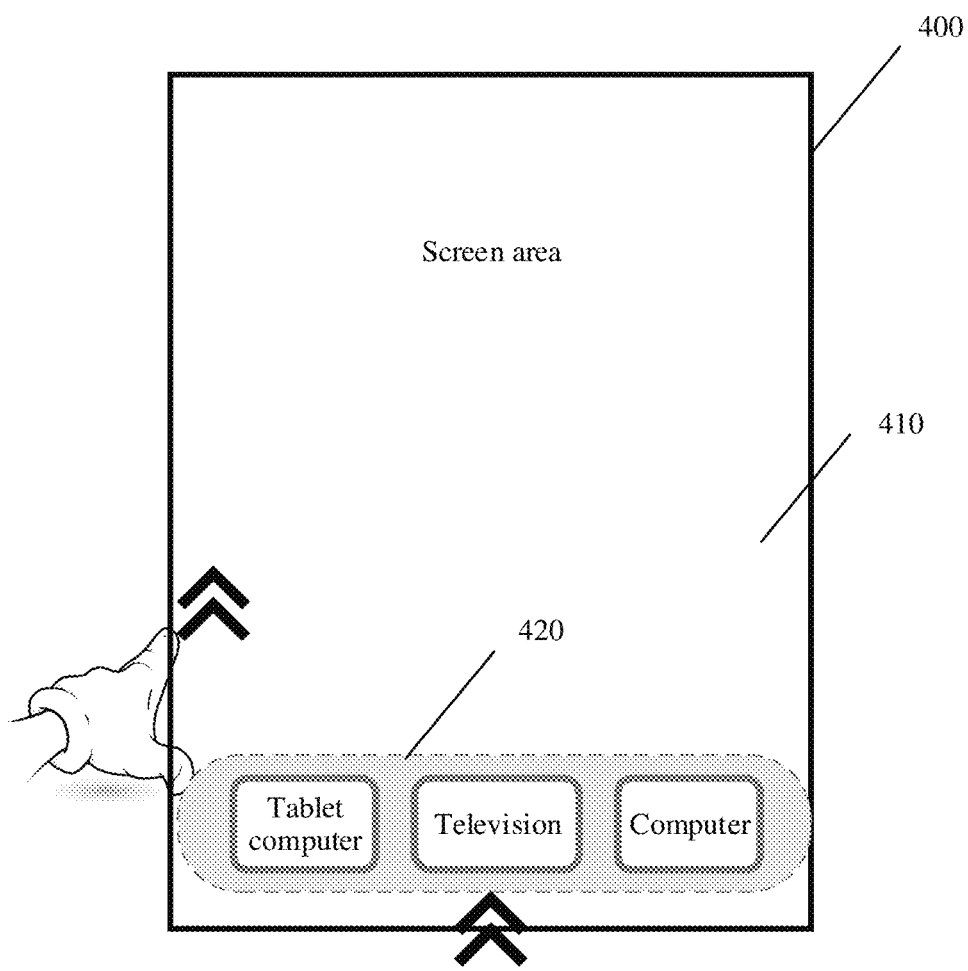

Descriptions are provided with reference to FIG. 3A and FIG. 3B. FIG. 3A is a schematic diagram of a user interface of a local primary terminal. A user interface 300 of the local primary terminal may include a picture display area 310 and an operation area 320. The picture display area 310 is used to display a screen sharing picture of the current local primary terminal and the peer terminal. The operation area 320 is used to display a key or a control operated by the user.

The operation area 320 may include an operation key 321. The user may tap the operation key 321 to pop up a device candidate area 330. The device candidate area 330 may include one or more candidate local secondary terminals. The user may select one or more local secondary terminals. Therefore, the first instruction is generated, so that the local primary terminal may send a screen sharing request to the selected one or more local secondary terminals.

Optionally, FIG. 3B is a schematic diagram of a user interface of the local secondary terminal. A user interface 400 of the local secondary terminal may include a screen area 410, and the screen area 410 is used to display current screen information. The user may slide by using a gesture, for example, sliding up or multi-finger sliding, so that a device candidate area 420 may pop up in the current screen area 410. The device candidate area 420 may include one or more local terminals. The user may select one local terminal as the local primary terminal. Therefore, the first instruction may be generated, so that the local secondary terminal may initiate a screen sharing request to the selected local primary terminal, to share a screen.

Optionally, in a process of selecting the local primary terminal, the local primary terminal may be selected from the device candidate area 420 by the user by tapping an icon of the local terminal, or a current screen may be dragged onto an icon corresponding to the selected local terminal through multi-finger sliding, to select the local primary terminal. This is not limited in this embodiment of this application.

Step 103: In response to the detected first instruction, share screen information of the local secondary terminal on a screen of the peer terminal according to the first instruction.

Specifically, after the first instruction is generated on the local primary terminal, the local primary terminal may send the first instruction to a local secondary terminal corresponding to the first instruction, so that the local secondary terminal that receives the first instruction may establish a direct connection to the local primary terminal, and the local secondary terminal may send screen information to the local primary terminal after establishing the direct connection. For ease of description, a local secondary terminal to which a direct connection is established to the local primary terminal is referred to as a screen sharing device below. Optionally, the local primary terminal may alternatively receive a first instruction from any local secondary terminal. After receiving the first instruction, the local primary terminal may establish a direct connection to the local secondary terminal according to the first instruction, so that the local secondary terminal may send screen information to the local primary terminal.

Figure 1B:
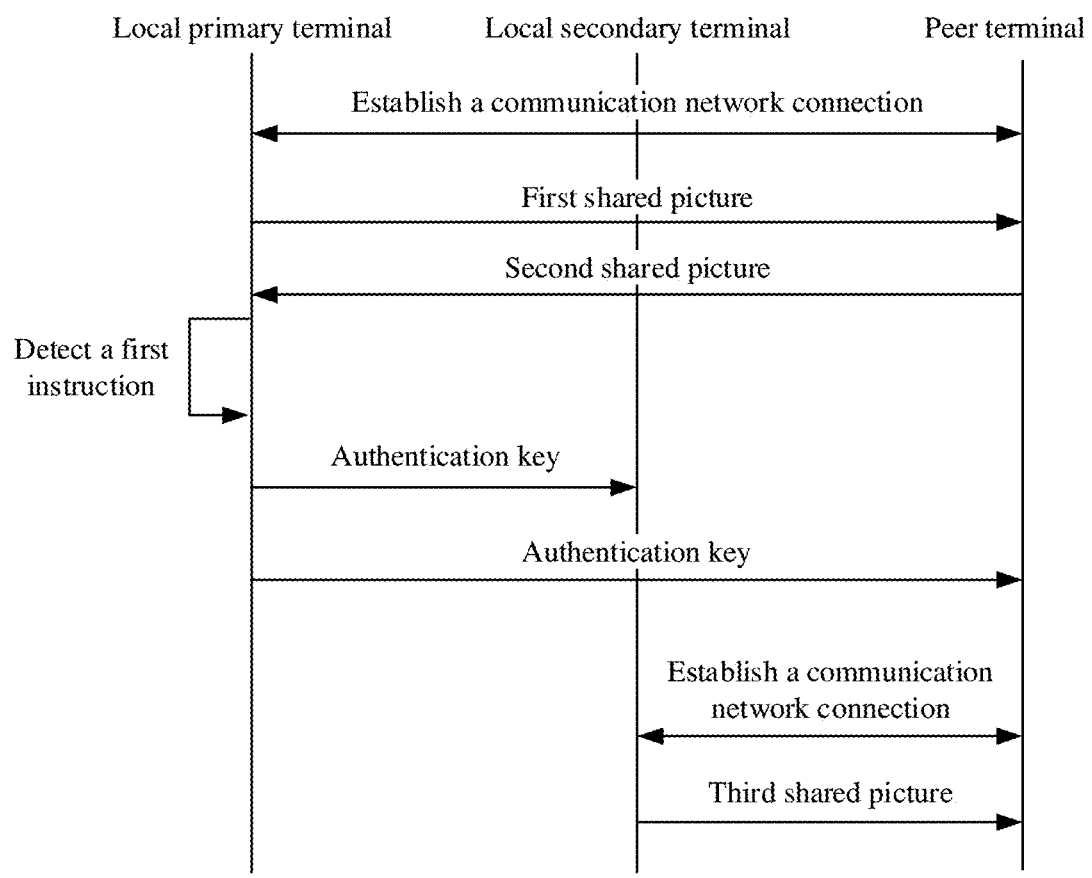
FIG. 1B is a flowchart of another embodiment of a screen sharing method in this application.

Optionally, as shown in FIG. 1B, after detecting the first instruction, the local primary terminal may further separately send an authentication key to a corresponding local secondary terminal and the peer terminal. The authentication key includes one encryption key and one decryption key. If the encryption key is sent to the local secondary terminal, the decryption key is sent to the peer terminal. If the decryption key is sent to the local secondary terminal, the encryption key is sent to the peer terminal.

It should be understood that the decryption key and the encryption key may be a pair of symmetric keys; in other words, both the decryption key and the encryption key are used for encryption and decryption. When encryption is performed by using the encryption key, the decryption key may be used for decryption. When encryption is performed by using the decryption key, the encryption key may be used for decryption.

It should be noted that if the first instruction is generated by the local primary terminal, because one or more local secondary terminals may be selected on the local primary terminal, that is, the first instruction may include device identifiers of the one or more local secondary terminals, the decryption key or the encryption key may be sent to the one or more local secondary terminals; and if the first instruction is generated by any local secondary terminal, and the local secondary terminal sends the first instruction to the local primary terminal, for example, the local secondary terminal selects the local primary terminal and initiates a screen sharing request, the local primary terminal may send the decryption key or the encryption key to the local secondary terminal that currently initiates the request.

Further, after any local secondary terminal and the peer terminal receive respective authentication keys, communication network connection authentication may be initiated between the local secondary terminal and the peer terminal. The communication network connection authentication is used to establish a communication network connection between the local secondary terminal and the peer terminal. After authentication is performed between the local secondary terminal and the peer terminal by using the key, if the authentication succeeds, the communication network connection may be established between the local secondary terminal and the peer terminal; in other words, the local secondary terminal may directly send screen information to the peer terminal.

Optionally, after the communication network connection is established between the local secondary terminal and the peer terminal, the local secondary terminal may further send a communication acknowledgement message to the local primary terminal. The communication acknowledgement message is used to identify that the communication network connection has been established between the local secondary terminal and the peer terminal.

Further, if the first instruction is generated by the local primary terminal, the first instruction may further include a parameter used to generate screen information. The parameter may include one or more of a location, a range, resolution, or a frame rate of the screen information. For example, after receiving the first instruction, the local secondary terminal may generate the corresponding screen information based on the parameter in the first instruction, and may send the screen information to the local primary terminal or the peer terminal. In a transmission process, the screen information may be implemented in a form of a video frame. For example, operations such as compression and encoding may be performed on the video frame on the local secondary terminal to obtain corresponding video encoding information, and the video encoding information is sent to the local primary terminal or the peer terminal, so that the local primary terminal or the peer terminal decodes the video encoding information to obtain the corresponding screen information, and displays the screen information on the local primary terminal or the peer terminal.

It should be understood that, in a process in which the local secondary terminal sends the video encoding information, the video encoding information of the local secondary terminal may be forwarded by the local primary terminal. For example, the local secondary terminal may first send the video encoding information to the local primary terminal, and the local primary terminal forwards the received video encoding information of the local secondary terminal to the peer terminal. After receiving the video encoding information, the peer terminal may decode and render the video encoding information, and display the video encoding information on the peer terminal, to share the screen information. Alternatively, the local primary terminal may send an authentication key to the local secondary terminal and the peer terminal, so that the local secondary terminal directly establishes a communication network connection to the peer terminal, and the local secondary terminal directly sends the screen information to the peer terminal, to share a screen.

Figure 4:
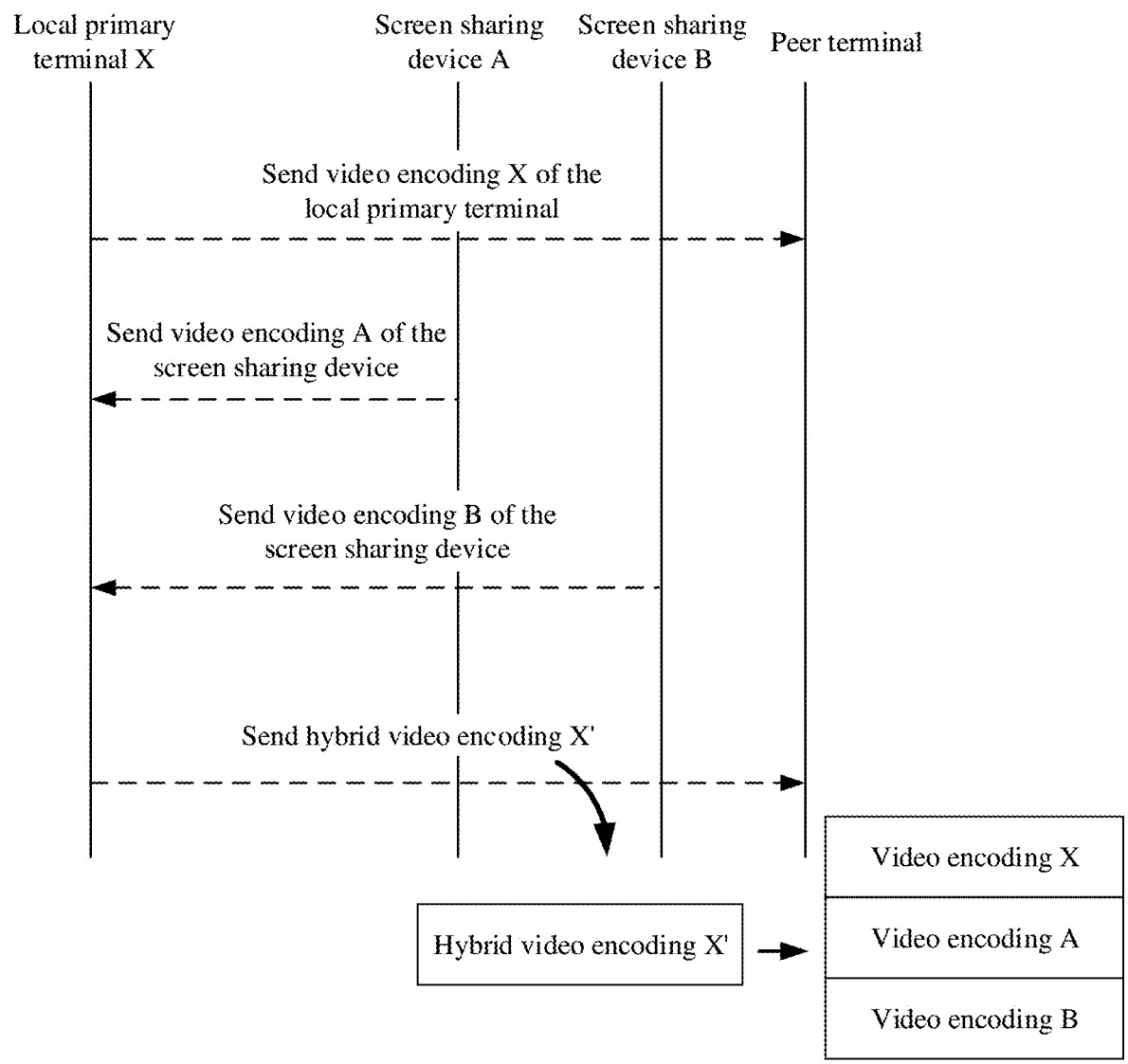
FIG. 4 is a schematic diagram of hybrid encoding of a local primary terminal according to an embodiment of this application.

Optionally, after receiving the video encoding information from the local secondary terminal, the local primary terminal may further mix the video encoding information with encoding information between the local primary terminal and the peer terminal. Descriptions are provided with reference to FIG. 4. As shown in FIG. 4, a communication network connection is established between the local primary terminal and the peer terminal, and video encoding information X is transmitted; in other words, the local primary terminal may send the video encoding information X of the local primary terminal to the peer terminal. In this case, the local primary terminal receives video encoding information A of a screen sharing device A and video encoding information B of a screen sharing device B. In this way, the video encoding information X and the video encoding information A are mixed with the local secondary terminal B to obtain hybrid video encoding information X', and the hybrid video encoding information X' may be sent to the peer terminal. Therefore, a quantity of rendering times of the peer terminal can be reduced, and processing efficiency of the terminal can be improved.

It should be noted that after receiving the video encoding information of the local primary terminal, the peer terminal may decode and render the video encoding information of the local primary terminal, to generate a shared picture corresponding to the video encoding information of the local primary terminal, that is, the first shared picture. After receiving the video encoding information of the screen sharing device, the peer terminal may also render the video encoding information of the screen sharing device, to generate a shared picture corresponding to the video encoding information of the screen sharing device, that is, the third shared picture. The video encoding information of the screen sharing device may be forwarded by the local primary terminal to the peer terminal. After receiving video encoding information of the peer terminal, the local primary terminal may render the video encoding information of the peer terminal, to generate a shared picture corresponding to the video encoding information of the peer terminal, that is, the second shared picture.

Figure 5A:
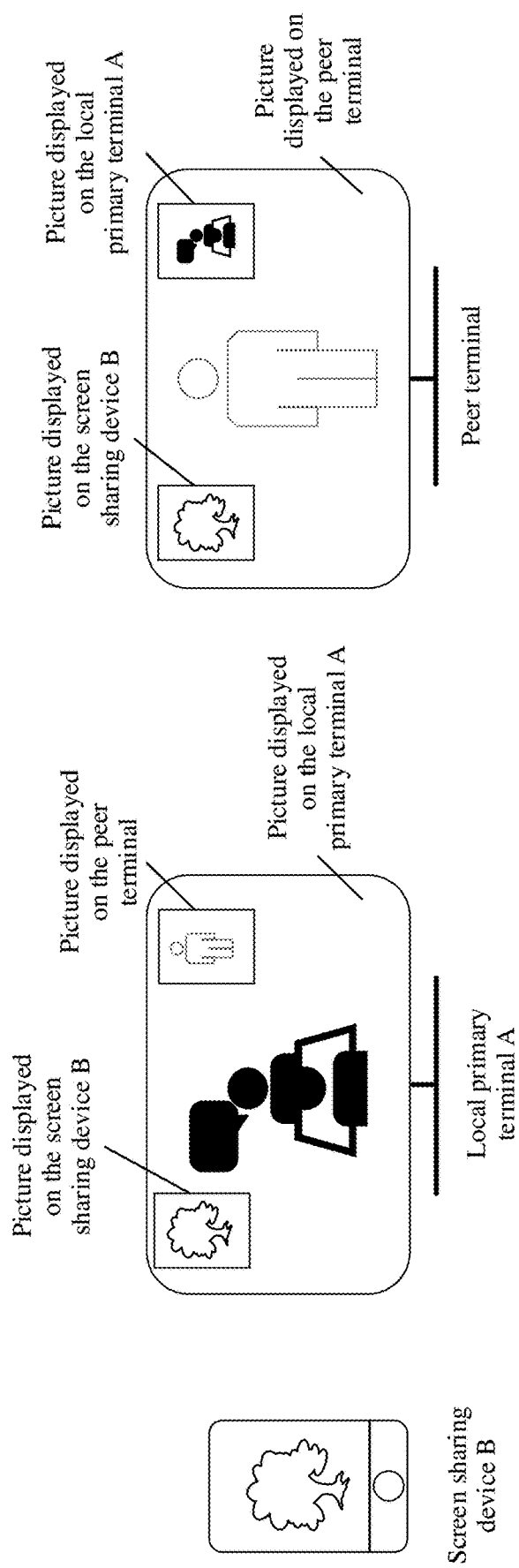
FIG. 5A and FIG. 5B each are an effect diagram of a screen sharing display interface according to an embodiment of this application.

Optionally, after receiving video encoding information from any screen sharing device, the local primary terminal may further decode and render the video encoding information of the screen sharing device to generate the third shared picture, and may display the third shared picture on a display of the local primary terminal, that is, a first interface. The video encoding information of the screen sharing device may also be forwarded to the peer terminal. After receiving the video encoding information of the local primary terminal and the video encoding information of the screen sharing device, the peer terminal may decode and render the video encoding information of the local primary terminal and the video encoding information of the screen sharing device, to separately generate the first shared picture corresponding to the video encoding information of the local primary terminal and the third shared picture corresponding to the video encoding information of the screen sharing device, and may display the first shared picture and the third shared picture on a display of the peer terminal, that is, a second interface. The first shared picture does not include the third shared picture on the second interface. In addition, the first shared picture corresponding to the local primary terminal may be displayed on the first interface of the local primary terminal, or the first shared picture corresponding to the local primary terminal may not be displayed on the first interface of the local primary terminal. FIG. 5A is a diagram of a display effect of the local primary terminal and the peer terminal, so that the user can more intuitively know a current screen sharing situation, and user experience can be improved.

Figure 5B:
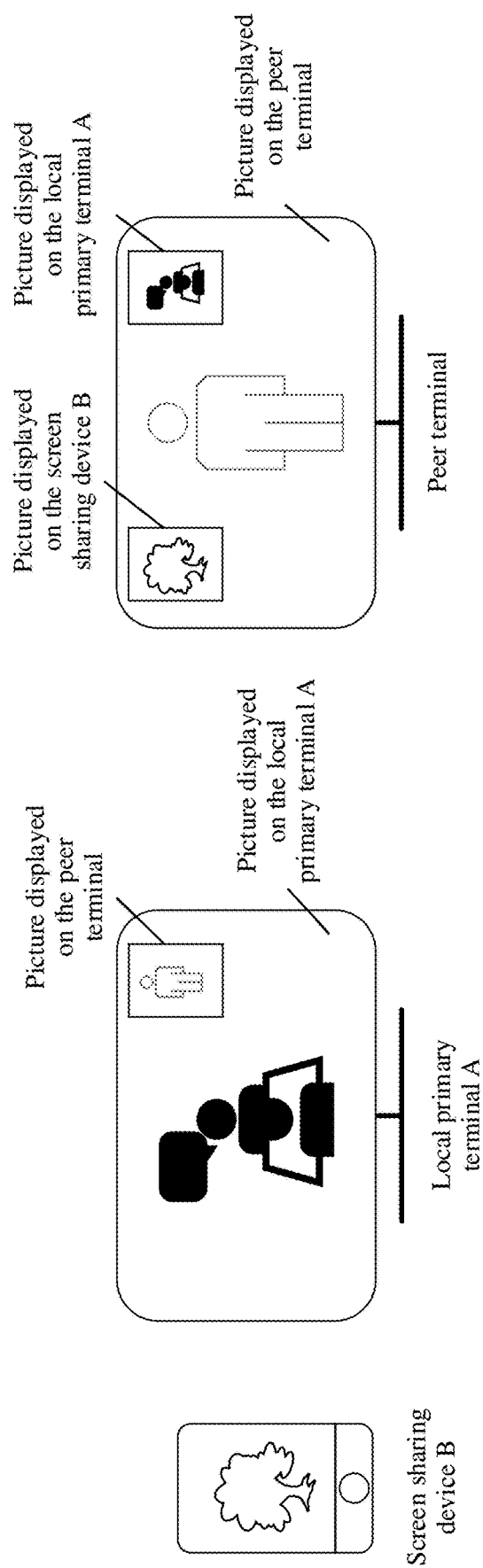

Optionally, the screen sharing device may further directly establish a communication network connection to the peer terminal, and directly send the video encoding information of the screen sharing device to the peer terminal, or after receiving the video encoding information of the screen sharing device, the local primary terminal does not decode or render the video encoding information of the screen sharing device but directly forwards the video encoding information of the screen sharing device to the peer terminal, that is, does not display the third shared picture on the display of the local primary terminal. After receiving the video encoding information of the screen sharing device and the video encoding information of the local primary terminal, the peer terminal may perform decoding and rendering to separately obtain the first shared picture and the third shared picture, and may display the first shared picture and the third shared picture on the display of the peer terminal. The first shared picture does not include the third shared picture. FIG. 5B is a diagram of display effects of the local primary terminal and the peer terminal.

It should be noted that, on the display interfaces of the local primary terminal and the peer terminal, the user may adjust a window location and a size of a display picture of the screen sharing device. For example, on the display interface of the local primary terminal, the display picture of the screen sharing device may be a large window, and a display picture of the peer terminal and a screen information display picture of the local primary terminal may be small windows. On the display interface of the peer terminal, the display picture of the screen sharing device may be a large window, and a display picture of the local primary terminal and a screen information display picture of the peer terminal may be small windows. In addition, on the display interface of the local primary terminal, the first shared picture of the local primary terminal may be displayed, or the first shared picture of the local primary terminal may not be displayed. This is not limited in this embodiment of this application.

Figure 6:
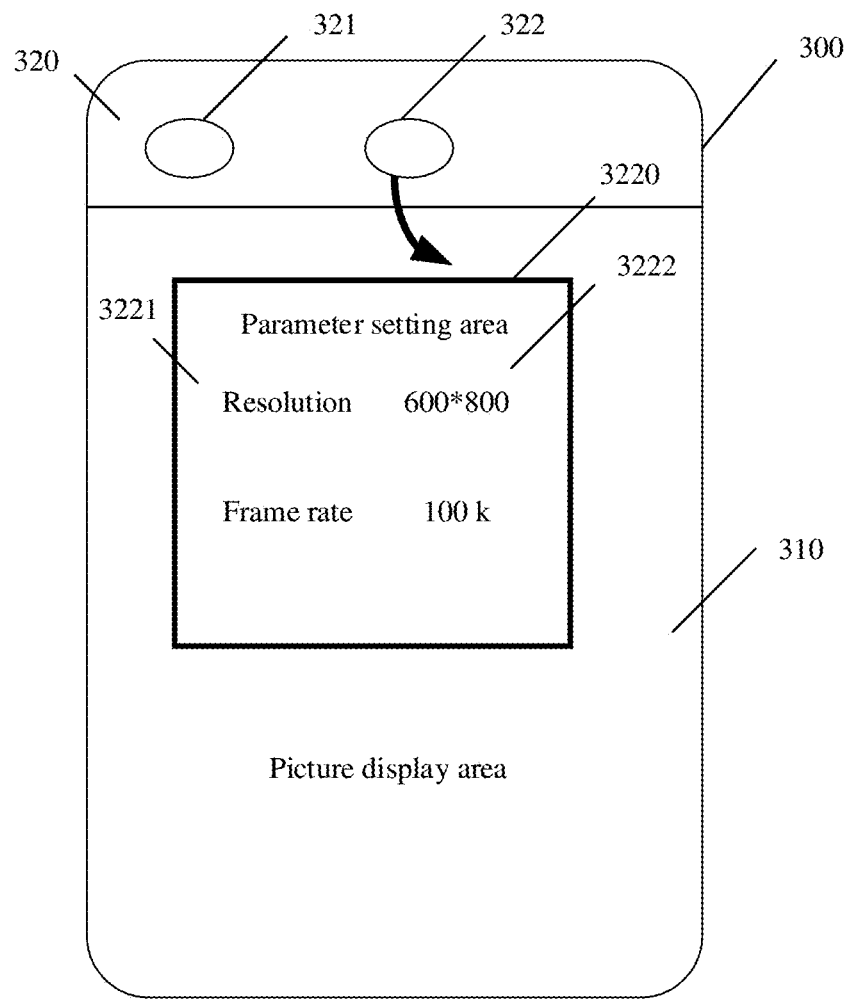
FIG. 6 is a schematic diagram of another embodiment of a display interface of a local primary terminal according to this application.

Further, after receiving the video encoding information of any screen sharing device, the local primary terminal may further adjust a parameter corresponding to the video encoding information. The parameter may include one or more of a location, a range, resolution, or a frame rate of the screen information. Adjustment of the parameter may be initiated by the user. If an operation of adjusting the parameter by the user is detected, a parameter change request, that is, a second instruction, may be generated based on the operation of the user, and the second instruction is sent to the corresponding screen sharing device, so that the corresponding screen sharing device changes the parameter to adapt to a screen sharing requirement. As shown in FIG. 6, the operation area 320 in the user interface 300 of the local primary terminal may further include a parameter setting key 322. The user taps the parameter setting key 322, so that a parameter setting area 3220 may pop up. The parameter setting area 3220 may include a parameter option 3221 and a parameter candidate area 3222, the parameter option 3221 is used to identify a to-be-changed parameter, and the parameter candidate area 3222 is used to select a proper value for the to-be-changed parameter. The value may be selected in a drop-down list form or in a candidate box form. This is not limited in this embodiment of this application.

Optionally, adjustment of the parameter may alternatively be initiated by the peer terminal; in other words, when receiving a parameter adjustment request from the peer terminal, the local primary terminal may send a parameter change request to the screen sharing device based on parameter setting in the request.

The foregoing embodiment is described by using an example in which the communication network connection is established between the local primary terminal and the peer terminal. It may be understood that a case in which the local primary terminal and the peer terminal are in a same local network is not ruled out; in other words, the local primary terminal and the peer terminal may be in the same local network, and a local connection may be established between the local primary terminal and the peer terminal.

In this embodiment, after a communication network connection is established between any local terminal in the local network and the peer terminal, a screen sharing request may be initiated to another local terminal in the local network, to display information of the another local terminal on the peer terminal, so that a plurality of local terminals can share screens with the peer terminal. In this way, screen sharing convenience, screen sharing efficiency, and user experience can be improved.

Figure 7:
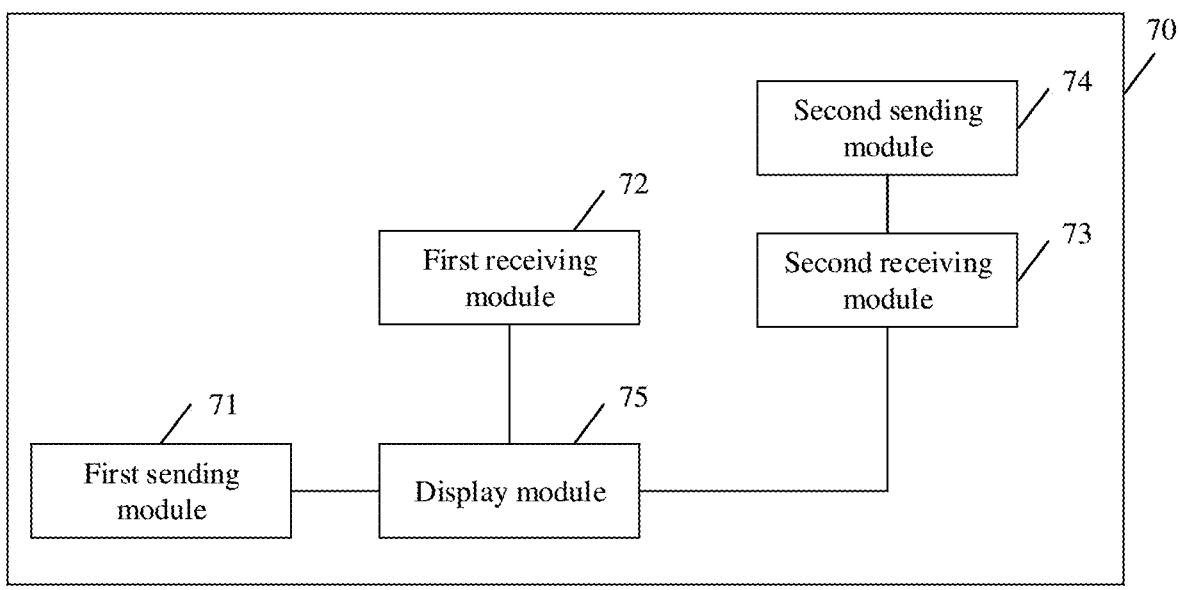
FIG. 7 is a schematic diagram of a structure of an embodiment of a terminal according to this application.

FIG. 7 is a schematic diagram of a structure of an embodiment of a first local terminal according to this application. As shown in FIG. 7, a first local terminal 70 may include a first sending module 71, a first receiving module 72, a second receiving module 73, a second sending module 74, and a display module 75.

The first sending module 71 is configured to send a first shared picture of the first local terminal to a peer terminal by the first local terminal.

The first receiving module 72 is configured to receive, by the first local terminal, a second shared picture of the peer terminal that is sent by the peer terminal.

The second receiving module 73 is configured to receive, by the first local terminal, a third shared picture of a second local terminal that is sent by the second local terminal.

The second sending module 74 is configured to send the third shared picture to the peer terminal by the first local terminal.

The display module 75 is configured to display a first interface by the first local terminal. The first interface includes at least the second shared picture, the first local terminal is connected to the peer terminal by using a communication network, the first local terminal is directly connected to the second local terminal, a second interface displayed on the peer terminal includes the first shared picture and the third shared picture, and the first shared picture does not include the third shared picture.

In a possible implementation, the first local terminal 70 may further include a request module 76.

The request module 76 is configured to: receive, by the first local terminal, a first operation in which a user selects the second local terminal from a plurality of local terminals, and send, by the first local terminal, a sharing request to the second local terminal in response to the first operation, so that the second local terminal sends the third shared picture to the first local terminal after establishing a direct connection to the first local terminal based on the sharing request.

In a possible implementation, the first local terminal 70 may further include a connection module 77.

The connection module 77 is configured to: receive, by the first local terminal, a sharing request sent by the second local terminal, and establish the direct connection to the second local terminal based on the sharing request, so that the second local terminal sends the third shared picture to the first local terminal after the direct connection is established to the first local terminal.

In a possible implementation, the first interface further includes the third shared picture, or the first interface does not include the third shared picture.

In a possible implementation, the first interface further includes the first shared picture, or the first interface does not include the first shared picture.

In a possible implementation, the first local terminal 70 may further include a disconnection module 78 and a third sending module 79.

The disconnection module 78 is configured to disconnect the communication network connection to the peer terminal by the first local terminal.

The third sending module 79 is configured to send the first shared picture to the second local terminal by the first local terminal, so that the second local terminal sends the first shared picture and the third shared picture to the peer terminal. The second local terminal is connected to the peer terminal by using the communication network, a third interface of the second local terminal includes at least the second shared picture, the second interface displayed on the peer terminal includes the first shared picture and the third shared picture, and the third shared picture does not include the first shared picture.

In a possible implementation, the first local terminal 70 may further include an adjustment module 7A.

The adjustment module 7A is configured to: receive, by the first local terminal, a second operation in which a user adjusts a parameter of the third shared picture, and send, by the first local terminal, a picture parameter adjustment request to the second local terminal in response to the second operation, so that the second local terminal sends the third shared picture to the first local terminal after adjusting the third shared picture based on the picture parameter adjustment request.

The first local terminal provided in the embodiment shown in FIG. 7 may be configured to perform the technical solutions of the method embodiments shown in FIG. 1 to FIG. 6 in this application. For implementation principles and technical effects of the first local terminal, further refer to related descriptions in the method embodiments.

It should be understood that the foregoing module division of the first local terminal shown in FIG. 7 is merely logical function division. In actual implementation, all or some of the modules may be integrated into a same physical entity, or may be physically separated. In addition, all these modules may be implemented in a form of software by invoking a processing element; or all these modules may be implemented in a form of hardware; or some modules may be implemented in a form of software by invoking a processing element, and some modules are implemented in a form of hardware. For example, a detection module may be a separately disposed processing element, or may be integrated into a chip of an electronic device for implementation. An implementation of other modules is similar to this. In addition, all or some of these modules may be integrated together, or may be implemented independently. In an implementation process, steps in the foregoing methods or the foregoing modules can be completed by using a hardware integrated logical circuit in the processing element, or by using instructions in a form of software.

For example, the foregoing modules may be one or more integrated circuits configured to implement the foregoing method, for example, one or more application-specific integrated circuits (Application-Specific Integrated Circuit, ASIC for short below), one or more microprocessors (Digital Signal Processor, DSP for short below), or one or more field programmable gate arrays (Field Programmable Gate Array, FPGA for short below). For another example, these modules may be integrated and implemented in a form of a system-on-a-chip (System-On-a-Chip, SOC for short below).

Figure 8:
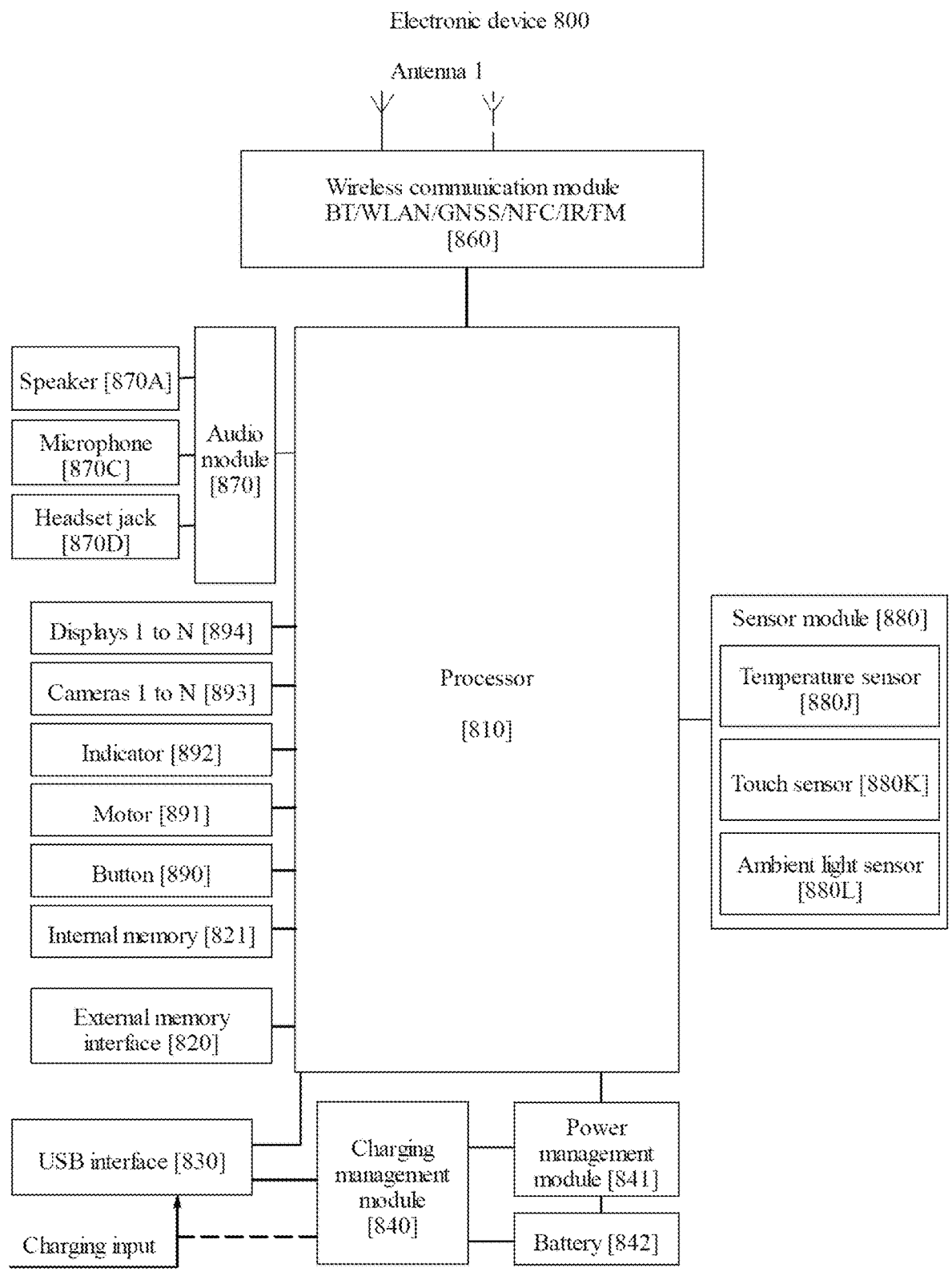
FIG. 8 is a schematic diagram of a structure of another embodiment of a terminal according to this application.

The local terminal and the peer terminal may be electronic devices. As shown in FIG. 8, an electronic device 800 may include a processor 810, an external memory interface 820, an internal memory 821, a universal serial bus (universal serial bus, USB) interface 830, a charging management module 840, a power management module 841, a battery 842, an antenna 1, a wireless communication module 860, an audio module 870, a speaker 870A, a microphone 80C, a headset jack 870D, a sensor module 880, a button 890, a motor 891, an indicator 892, a camera 893, a display 894, and the like. The sensor module 880 may include a temperature sensor 880J, a touch sensor 880K, an ambient light sensor 880L, and the like.

It may be understood that the structure shown in this embodiment of this application does not constitute a specific limitation on the electronic device 800. In some other embodiments of this application, the electronic device 800 may include more or fewer components than those shown in the figure, combine some components, split some components, or have different component arrangements. The components shown in the figure may be implemented by using hardware, software, or a combination of software and hardware.

The processor 810 may include one or more processing units. For example, the processor 810 may include an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, a neural network processing unit (neural-network processing unit, NPU), and/or the like. Different processing units may be independent devices, or may be integrated into one or more processors.

A memory may be disposed in the processor 810, and is configured to store instructions and data. In some embodiments, the memory in the processor 810 is a cache. The memory may store instructions or data that has been used or is cyclically used by the processor 810. If the processor 810 needs to use the instructions or the data again, the processor may directly invoke the instructions or the data from the memory. This avoids repeated access, reduces waiting time of the processor 810, and improves system efficiency.

In some embodiments, the processor 810 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

The I2C interface is a two-way synchronization serial bus, and includes one serial data line (serial data line, SDA) and one serial clock line (serial clock line, SCL). In some embodiments, the processor 810 may include a plurality of groups of I2C buses. The processor 810 may be separately coupled to the touch sensor 880K, a charger, a flashlight, the camera 893, and the like through different I2C bus interfaces. For example, the processor 810 may be coupled to the touch sensor 880K by using the I2C interface, so that the processor 810 communicates with the touch sensor 880K by using the I2C bus interface, to implement a touch function of the electronic device 800, for example, to implement a function of detecting the first instruction in step 102.

The I2S interface may be used for audio communication. In some embodiments, the processor 810 may include a plurality of groups of I2S buses. The processor 810 may be coupled to the audio module 870 through the I2S bus, to implement communication between the processor 810 and the audio module 870. In some embodiments, the audio module 870 may transmit an audio signal to the wireless communication module 860 by using the I2S interface, to implement a function of keeping a call during screen sharing.

The PCM interface may also be used for audio communication, and analog signal sampling, quantization, and coding. In some embodiments, the audio module 870 may be coupled to the wireless communication module 860 through a PCM bus interface. In some embodiments, the audio module 870 may also transmit an audio signal to the wireless communication module 860 by using the PCM interface, to implement a function of keeping a call during screen sharing. Both the I2S interface and the PCM interface may be used for audio communication.

The UART interface is a universal serial data bus, and is used for asynchronous communication. The bus may be a two-way communication bus. The bus converts to-be-transmitted data between serial communication and parallel communication. In some embodiments, the UART interface is usually used to connect the processor 810 to the wireless communication module 860. For example, the processor 810 communicates with the wireless communication module 860 by using the UART interface, to implement a function of transmitting video encoding data, for example, to implement a related operation in step 103.

The MIPI interface may be configured to connect the processor 810 to a peripheral component such as the display 894 or the camera 893. The MIPI interface includes a camera serial interface (camera serial interface, CSI), a display serial interface (display serial interface, DSI), and the like. In some embodiments, the processor 810 communicates with the camera 893 through the CSI interface, to implement a photographing function of the electronic device 800. The processor 810 and the display 894 communicate with each other by using the DSI interface, to implement a display function of the electronic device 800, for example, implement a screen sharing function in step 103.

The GPIO interface may be configured by using software. The GPIO interface may be configured as a control signal, or may be configured as a data signal. In some embodiments, the GPIO interface may be configured to connect the processor 810 to the camera 893, the display 894, the wireless communication module 860, the audio module 870, the sensor module 880, or the like. The GPIO interface may be configured as the I2C interface, the I2S interface, the UART interface, the MIPI interface, or the like.

The USB interface 830 is an interface that conforms to a USB standard specification, and may be specifically a mini USB interface, a micro USB interface, a USB Type C interface, or the like. The USB interface 830 may be configured to connect to a charger to charge the electronic device 800, or may be configured to transmit data between the electronic device 800 and a peripheral device, or may be configured to connect to a headset, to play audio by using the headset. The interface may be configured to connect to another electronic device such as an augmented reality (augmented reality, AR) device.

It may be understood that an interface connection relationship between the modules that is shown in this embodiment of the present disclosure is merely an example for description, and does not constitute a limitation on a structure of the electronic device 800. In some other embodiments of this application, the electronic device 800 may alternatively use an interface connection manner different from that in the foregoing embodiment, or use a combination of a plurality of interface connection manners.

The charging management module 840 is configured to receive a charging input from the charger. The charger may be a wireless charger or a wired charger. In some embodiments of wired charging, the charging management module 840 may receive a charging input from a wired charger through the USB interface 830. In some embodiments of wireless charging, the charging management module 840 may receive a wireless charging input through a wireless charging coil of the electronic device 800. The charging management module 840 may further supply power to the electronic device by using the power management module 841 while charging the battery 842.

The power management module 841 is configured to connect the battery 842 and the charging management module 840 to the processor 810. The power management module 841 receives an input from the battery 842 and/or the charging management module 840, and supplies power to the processor 810, the internal memory 821, the display 894, the camera 893, the wireless communication module 860, and the like. The power management module 841 may be configured to monitor parameters such as a battery capacity, a battery cycle count, and a battery health status (electric leakage and impedance). In some other embodiments, the power management module 841 may alternatively be disposed in the processor 810. In some other embodiments, the power management module 841 and the charging management module 840 may alternatively be disposed in a same component.

A wireless communication function of the electronic device 800 may be implemented by using the antenna 1, the wireless communication module 860, or the like.

The antenna 1 is configured to transmit and receive an electromagnetic wave signal. Each antenna in the electronic device 800 may be configured to cover one or more communication frequency bands. Different antennas may be multiplexed, to improve antenna utilization. For example, the antenna 1 may be multiplexed as a diversity antenna in a wireless local area network. In some other embodiments, an antenna may be used in combination with a tuning switch.

The wireless communication module 860 may provide a solution that is for wireless communication including a wireless local area network (wireless local area network, WLAN) (such as a wireless fidelity (wireless fidelity, Wi-Fi) network), Bluetooth (Bluetooth, BT), a global navigation satellite system (global navigation satellite system, GNSS), frequency modulation (frequency modulation, FM), a near field communication (near field communication, NFC) technology, an infrared (infrared, IR), and the like and that is applied to the electronic device 800. The wireless communication module 860 may be one or more components integrating at least one communication processor module. The wireless communication module 860 receives an electromagnetic wave through the antenna 1, performs frequency modulation and filtering processing on an electromagnetic wave signal, and sends a processed signal to the processor 810. The wireless communication module 860 may further receive a to-be-sent signal from the processor 810, perform frequency modulation and amplification on the signal, and convert the signal into an electromagnetic wave for radiation through the antenna 1.

In some embodiments, the antenna 1 of the electronic device 800 is coupled to the wireless communication module 860, so that the electronic device 800 may communicate with a network and another device by using a wireless communication technology, for example, implement operations of establishing a communication connection, sending and receiving video stream data, and receiving a screen sharing instruction in step 101 and step 103. The wireless communication technology may include BT, GNSS, WLAN, NFC, FM, and/or IR technologies. The GNSS may include a global positioning system (global positioning system, GPS), a global navigation satellite system (global navigation satellite system, GLONASS), a BeiDou navigation satellite system (BeiDou navigation satellite system, BDS), a quasi-zenith satellite system (quasi-zenith satellite system, QZSS), and/or a satellite-based augmentation system (satellite based augmentation systems, SBAS).

The electronic device 800 implements a display function by using the GPU, the display 894, and the application processor, for example, implements a picture rendering and display function in step 101 and step 103. The GPU is a microprocessor for image processing, and is connected to the display 894 and the application processor. The GPU is configured to: perform mathematical and geometric calculation, and render an image. The processor 810 may include one or more GPUs that execute program instructions to generate or change display information.

The display 894 is configured to display an image, a video, or the like. The display 894 includes a display panel. The display panel may be a liquid crystal display (liquid crystal display, LCD), an organic light-emitting diode (organic light-emitting diode, OLED), an active matrix organic light-emitting diode (active-matrix organic light emitting diode, AMOLED), a flexible light-emitting diode (flex light-emitting diode, FLED), a mini LED, a micro LED, a micro-OLED, a quantum dot light-emitting diode (quantum dot light emitting diodes, QLED), or the like. In some embodiments, the electronic device 800 may include one or N displays 894, where N is a positive integer greater than 1.

The electronic device 800 can implement a photographing function by using the ISP, the camera 893, the video codec, the GPU, the display 894, the application processor, and the like.

The ISP is configured to process data fed back by the camera 893. For example, during photographing, a shutter is pressed, and light is transmitted to a photosensitive element of the camera through a lens. An optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera 893.

The camera 893 is configured to capture a static image or a video. An optical image of an object is generated through the lens, and is projected onto the photosensitive element. The photosensitive element may be a charge coupled device (charge coupled device, CCD) or a complementary metal-oxide-semiconductor (complementary metal-oxide-semiconductor, CMOS) photoelectric transistor. The photosensitive element converts an optical signal into an electrical signal, and then transmits the electrical signal to the ISP for converting the electrical signal into a digital image signal. The ISP outputs the digital image signal to the DSP for processing. The DSP converts the digital image signal into an image signal in a standard format, for example, RGB or YUV. In some embodiments, the electronic device 800 may include one or N cameras 893, where N is a positive integer greater than 1.

The digital signal processor is configured to process a digital signal, and may process another digital signal in addition to the digital image signal. For example, when the electronic device 800 selects a frequency, the digital signal processor is configured to perform Fourier transform on frequency energy.

The video codec is configured to: compress or decompress a digital video. The electronic device 800 may support one or more types of video codecs. Therefore, the electronic device 800 may play or record videos in a plurality of coding formats, for example, moving picture experts group (moving picture experts group, MPEG)-1, MPEG-2, MPEG-3, and MPEG-4.

The NPU is a neural-network (neural-network, NN) computing processor. The NPU quickly processes input information with reference to a structure of a biological neural network, for example, a transfer mode between human brain neurons, and may further continuously perform self-learning. Applications such as intelligent cognition of the electronic device 800, for example, image recognition, facial recognition, speech recognition, and text understanding, may be implemented through the NPU.

The external memory interface 820 may be used to connect to an external storage card, for example, a micro SD card, to extend a storage capability of the electronic device 800. The external storage card communicates with the processor 810 through the external memory interface 820, to implement a data storage function. For example, files such as music and a video are stored in the external storage card.

The internal memory 821 may be configured to store computer-executable program code. The executable program code includes instructions. The internal memory 821 may include a program storage area and a data storage area. The program storage area may store an operating system, an application required by at least one function (for example, a sound playing function or an image playing function), and the like. The data storage area may store data (such as audio data and an address book) and the like that are created during use of the electronic device 800. In addition, the internal memory 821 may include a high-speed random access memory, and may further include a nonvolatile memory, for example, at least one magnetic disk storage device, a flash memory device, or a universal flash storage (universal flash storage, UFS). The processor 810 runs instructions stored in the internal memory 821 and/or instructions stored in the memory disposed in the processor, to perform various function applications and data processing of the electronic device 800.

The electronic device 800 may implement an audio function, for example, music playing and recording, through the audio module 870, the speaker 870A, the microphone 870C, the headset jack 870D, the application processor, and the like.

The audio module 870 is configured to convert digital audio information into an analog audio signal output, and is also configured to convert an analog audio input into a digital audio signal. The audio module 870 may be configured to: code and decode an audio signal. In some embodiments, the audio module 870 may be disposed in the processor 810, or some functional modules of the audio module 870 are disposed in the processor 810.

The speaker 870A, also referred to as a "loudspeaker", is configured to convert an audio electrical signal into a sound signal. The electronic device 800 may listen to music or answer a hands-free call by using the speaker 870A.

The microphone 870C, also referred to as a "mike" or a "mic", is configured to convert a sound signal into an electrical signal. When making a call or sending speech information, a user may place the mouth of the user near the microphone 870C to make a sound, to input a sound signal to the microphone 870C. At least one microphone 870C may be disposed in the electronic device 800. In some other embodiments, two microphones 870C may be disposed in the electronic device 800, to collect a sound signal and further implement a noise reduction function. In some other embodiments, three, four, or more microphones 870C may alternatively be disposed in the electronic device 800, to collect a sound signal, implement noise reduction, and identify a sound source, to implement a directional recording function and the like.

The headset jack 870D is configured to connect to a wired headset. The headset jack 870D may be the USB interface 830 or a 3.5 mm open mobile terminal platform (open mobile terminal platform, OMTP) standard interface or a cellular telecommunication industry association of the USA (cellular telecommunication industry association of the USA, CTIA) standard interface.

The ambient light sensor 880L is configured to sense ambient light brightness. The electronic device 800 may adaptively adjust brightness of the display 894 based on the sensed ambient light brightness. The ambient light sensor 880L may also be configured to automatically adjust a white balance during photographing.

The temperature sensor 880J is configured to detect a temperature. In some embodiments, the electronic device 800 executes a temperature processing policy based on the temperature detected by the temperature sensor 880J. For example, when the temperature reported by the temperature sensor 880J exceeds a threshold, the electronic device 800 lowers performance of a processor near the temperature sensor 880J, to reduce power consumption and implement thermal protection. In some other embodiments, when the temperature is less than another threshold, the electronic device 800 heats the battery 842 to prevent the electronic device 800 from being shut down abnormally due to a low temperature. In some other embodiments, when the temperature is less than still another threshold, the electronic device 800 boosts an output voltage of the battery 842 to avoid abnormal shutdown due to a low temperature.

The touch sensor 880K is also referred to as a "touch component". The touch sensor 880K may be disposed on the display 894, and the touch sensor 880K and the display 894 form a touchscreen, which is also referred to as "touch screen". The touch sensor 880K is configured to detect a touch operation performed on or near the touch sensor. The touch sensor may transfer the detected touch operation to the application processor to determine a type of a touch event. A visual output related to the touch operation may be provided on the display 894. In some other embodiments, the touch sensor 880K may alternatively be disposed on a surface of the electronic device 800 at a position different from a position of the display 894.

The button 890 includes a power button, a volume button, and the like. The button 890 may be a mechanical button, or may be a touch button. The electronic device 800 may receive a button input, and generate a button signal input related to user settings and function control of the electronic device 800.

The motor 891 may generate a vibration prompt. The motor 891 may be configured to produce an incoming call vibration prompt and a touch vibration feedback. For example, touch operations performed on different applications (for example, photographing and audio playing) may correspond to different vibration feedback effects. For touch operations performed in different areas of the display 894, the motor 891 may also correspond to different vibration feedback effects. Different application scenarios (for example, time reminding, information receiving, an alarm clock, and a game) may also correspond to different vibration feedback effects. A touch vibration feedback effect may be customized.

The indicator 892 may be an indicator light, and may be configured to indicate a charging status and a power change, or may be configured to indicate a message, a missed call, a notification, and the like.

The electronic device 800 shown in FIG. 8 may be an intelligent electronic device such as a mobile phone, a television, a smart screen, a tablet computer, a notebook computer, or a PC. A form of the electronic device 800 is not limited in this embodiment. The electronic device 800 may be configured to perform a function/step in the method provided in embodiments of this application. For details, refer to the descriptions in the method embodiments of this application. To avoid repetition, detailed descriptions are appropriately omitted herein.

This application further provides an electronic device. The device includes a storage medium and a central processing unit, the storage medium may be a non-volatile storage medium, a computer-executable program is stored in the storage medium, and the central processing unit is connected to the non-volatile storage medium, and executes the computer-executable program to implement the method provided in the embodiments shown in FIG. 1 to FIG. 6.

In the foregoing embodiments, the involved processor may include, for example, a CPU, a DSP, a microcontroller, or a digital signal processor, and may further include a GPU and an embedded neural network processor (Neural-network Process Units, NPU for short below) and an image signal processor (Image Signal Processing, ISP for short below). The processor may further include a necessary hardware accelerator or logic processing hardware circuit, such as an ASIC or one or more integrated circuits configured to control execution of a program in the technical solutions in this application. In addition, the processor may have a function of operating one or more software programs, and the software programs may be stored in a storage medium.

An embodiment of this application further provides a first local terminal, including a display, one or more processors, a memory, a plurality of applications, and one or more computer programs stored in the memory. The one or more processors may be the processor 810, the memory may be the internal memory 821, and the display may be the display 894.

The one or more computer programs include instructions. When the instructions are executed by the first local terminal, the first local terminal is enabled to perform the following steps:

the first local terminal sends a first shared picture of the first local terminal to a peer terminal;

the first local terminal receives a second shared picture of the peer terminal that is sent by the peer terminal;

the first local terminal receives a third shared picture of a second local terminal that is sent by the second local terminal;

the first local terminal sends the third shared picture to the peer terminal; and the first local terminal displays a first interface, where the first interface includes at least the second shared picture, the first local terminal is connected to the peer terminal by using a communication network, the first local terminal is directly connected to the second local terminal, a second interface displayed on the peer terminal includes the first shared picture and the third shared picture, and the first shared picture does not include the third shared picture.

In a possible implementation, when the instructions are executed by the first local terminal, the first local terminal is further enabled to perform the following steps:

the first local terminal receives a first operation in which a user selects the second local terminal from a plurality of local terminals; and the first local terminal sends a sharing request to the second local terminal in response to the first operation, so that the second local terminal sends the third shared picture to the first local terminal after establishing a direct connection to the first local terminal based on the sharing request.

In a possible implementation, when the instructions are executed by the first local terminal, the first local terminal is further enabled to perform the following step:

the first local terminal receives a sharing request sent by the second local terminal, and establishes the direct connection to the second local terminal based on the sharing request, so that the second local terminal sends the third shared picture to the first local terminal after the direct connection is established to the first local terminal.

In a possible implementation, the first interface further includes the third shared picture, or the first interface does not include the third shared picture.

In a possible implementation, the first interface further includes the first shared picture, or the first interface does not include the first shared picture.

In a possible implementation, when the instructions are executed by the first local terminal, the first local terminal is further enabled to perform the following steps:

the first local terminal disconnects the communication network connection to the peer terminal; and the first local terminal sends the first shared picture to the second local terminal, so that the second local terminal sends the first shared picture and the third shared picture to the peer terminal, where the second local terminal is connected to the peer terminal by using the communication network, a third interface of the second local terminal includes at least the second shared picture, the second interface displayed on the peer terminal includes the first shared picture and the third shared picture, and the third shared picture does not include the first shared picture.

In a possible implementation, when the instructions are executed by the first local terminal, the first local terminal is further enabled to perform the following steps:

the first local terminal receives a second operation in which a user adjusts a parameter of the third shared picture; and the first local terminal sends a picture parameter adjustment request to the second local terminal in response to the second operation, so that the second local terminal sends the third shared picture to the first local terminal after adjusting the third shared picture based on the picture parameter adjustment request.

An embodiment of this application further provides a computer-readable storage medium. The computer-readable storage medium stores a computer program, and when the computer program is run on a computer, the computer is enabled to perform the method provided in the embodiments shown in FIG. 1 to FIG. 6 in this application.

An embodiment of this application further provides a computer program product. The computer program product includes a computer program. When the computer program product is run on a computer, the computer is enabled to perform the method provided in the embodiments shown in FIG. 1 to FIG. 6 in this application.

In embodiments of this application, "at least one" means one or more, and "a plurality of" means two or more. The term "and/or" describes an association relationship for describing associated objects and represents that three relationships may exist. For example, A and/or B may represent the following three cases: Only A exists, both A and B exist, and only B exists. A and B may be singular or plural numbers. The character "/" usually indicates an "or" relationship between associated objects. "At least one of the following items (pieces)" or a similar expression thereof indicates any combination of these items, including a single item (piece) or any combination of a plurality of items (pieces). For example, at least one of a, b, or c may indicate a, b, c, a and b, a and c, b and c, or a, b, and c, where a, b, and c may be singular or plural.

A person of ordinary skill in the art may be aware that, units and algorithm steps described in embodiments disclosed in this specification may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In several embodiments provided in this application, any function may be stored in a computer-readable storage medium when being implemented in the form of a software functional unit and sold or used as an independent product. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, or a network device) to perform all or some of the steps of the methods described in embodiments of this application. The foregoing storage medium includes any medium that can store program code, such as a USB flash drive, a removable hard disk, a read-only memory (Read-Only Memory, "ROM" for short), a random access memory (Random Access Memory, "RAM" for short), a magnetic disk, or an optical disc.

The foregoing descriptions are merely specific implementations of this application. Any variation or replacement readily figured out by a person skilled in the art within the technical scope disclosed in this application shall fall within the protection scope in this application. Therefore, the protection scope of this application shall be subject to the protection scope of the claims.

What is claimed is:

1. A method, comprising:
sending, by a first local terminal, a first picture of the first local terminal to a peer terminal;
receiving, by the first local terminal, a second picture of the peer terminal that is sent by the peer terminal;
receiving, by the first local terminal, a third picture of a second local terminal that is sent by the second local terminal;
sending, by the first local terminal, the third picture to the peer terminal;
displaying, by the first local terminal, a first interface, wherein the first interface comprises at least the second picture, the first local terminal is connected to the peer terminal using a communication network, the first local terminal is directly connected to the second local terminal, a second interface displayed on the peer terminal comprises the first picture and the third picture, and the first picture does not comprise the third picture;
when a communication network connection between the first local terminal and the peer terminal does not meet a preset transmission condition, disconnecting, by the first local terminal, the communication network connection to the peer terminal; and
sending, by the first local terminal, the first picture to the second local terminal, wherein the second local terminal sends the first picture and the third picture to the peer terminal, wherein the second local terminal is connected to the peer terminal using the communication network, a third interface of the second local terminal comprises at least the second picture, the second interface displayed on the peer terminal comprises the first picture and the third picture, and the third picture does not comprise the first picture.

2. The method according to claim 1, further comprising:
receiving, by the first local terminal, a first operation in which a user selects the second local terminal from a plurality of local terminals; and
sending, by the first local terminal, a sharing request to the second local terminal in response to the first operation, wherein the second local terminal sends the third picture to the first local terminal after establishing the direct connection to the first local terminal based on the sharing request.

3. The method according to claim 1, further comprising:
receiving, by the first local terminal, a sharing request sent by the second local terminal, and establishing the direct connection to the second local terminal based on the sharing request, wherein the second local terminal sends the third picture to the first local terminal after the direct connection is established to the first local terminal.

4. The method according to claim 1, wherein:
the first interface further comprises the third picture; or
the first interface does not comprise the third picture.

5. The method according to claim 1, wherein:
the first interface further comprises the first picture; or
the first interface does not comprise the first picture.

6. The method according to claim 1, further comprising:
receiving, by the first local terminal, a second operation in which a user adjusts a parameter of the third picture; and
sending, by the first local terminal, a picture parameter adjustment request to the second local terminal in response to the second operation, wherein the second local terminal sends the third picture to the first local terminal after adjusting the third picture based on the picture parameter adjustment request.

7. The method according to claim 1, wherein the first interface further comprises the first picture and the third picture.

8. A first local terminal, comprising:
a display;
one or more processors; and
a non-transitory memory storing computer instructions for a plurality of applications and one or more computer programs, wherein when the instructions are executed by the first local terminal, the first local terminal is enabled to perform the following:
send a first picture of the first local terminal to a peer terminal;
receive a second picture of the peer terminal that is sent by the peer terminal;
receive a third picture of a second local terminal that is sent by the second local terminal;
send the third picture to the peer terminal;
display a first interface, wherein the first interface comprises at least the second picture, the first local terminal is connected to the peer terminal using a communication network, the first local terminal is directly connected to the second local terminal, a second interface displayed on the peer terminal comprises the first picture and the third picture, and the first picture does not comprise the third picture;
disconnect a communication network connection to the peer terminal; and
send the first picture to the second local terminal, wherein the second local terminal sends the first picture and the third picture to the peer terminal, wherein the second local terminal is connected to the peer terminal using a communication network, a third interface of the second local terminal comprises at least the second picture, the second interface displayed on the peer terminal comprises the first picture and the third picture, and the third picture does not comprise the first picture.

9. The first local terminal according to claim 8, wherein when the instructions are executed by the first local terminal, the first local terminal is further enabled to perform the following steps:
receive a first operation in which a user selects the second local terminal from a plurality of local terminals; and
send a sharing request to the second local terminal in response to the first operation, wherein the second local terminal sends the third picture to the first local terminal after establishing the direct connection to the first local terminal based on the sharing request.

10. The first local terminal according to claim 8, wherein when the instructions are executed by the first local terminal, the first local terminal is further enabled to perform the following steps:
receive a sharing request sent by the second local terminal, and establish the direct connection to the second local terminal based on the sharing request, wherein the second local terminal sends the third picture to the first local terminal after the direct connection is established to the first local terminal.

11. The first local terminal according to claim 8, wherein:
the first interface further comprises the third picture; or
the first interface does not comprise the third picture.

12. The first local terminal according to claim 8, wherein:
the first interface further comprises the first picture; or
the first interface does not comprise the first picture.

13. The first local terminal according to claim 8, wherein when the instructions are executed by the first local terminal, the first local terminal is further enabled to perform the following steps:
receive a second operation in which a user adjusts a parameter of the third picture; and
send a picture parameter adjustment request to the second local terminal in response to the second operation, wherein the second local terminal sends the third picture to the first local terminal after adjusting the third picture based on the picture parameter adjustment request.

14. The first local terminal according to claim 8, wherein the first interface further comprises the first picture and the third picture.

15. A non-transitory computer-readable storage medium, wherein the non-transitory computer-readable storage medium stores a computer program, and when the computer program is run on a first local terminal, the computer program causes the first local terminal to perform:
sending a first picture of the first local terminal to a peer terminal;
receiving a second picture of the peer terminal that is sent by the peer terminal;
receiving a third picture of a second local terminal that is sent by the second local terminal;
sending the third picture to the peer terminal; and
displaying a first interface, wherein the first interface comprises at least the second picture, the first local terminal is connected to the peer terminal using a communication network, the first local terminal is directly connected to the second local terminal, a second interface displayed on the peer terminal comprises the first picture and the third picture, and the first picture does not comprise the third picture,
wherein when a communication network connection between the first local terminal and the peer terminal does not meet a preset transmission condition:
disconnecting the communication network connection to the peer terminal; and
sending the first picture to the second local terminal, wherein the second local terminal sends the first picture and the third picture to the peer terminal, wherein the second local terminal is connected to the peer terminal using a communication network, a third interface of the second local terminal comprises at least the second picture, the second interface displayed on the peer terminal comprises the first picture and the third picture, and the third picture does not comprise the first picture.

16. The computer-readable storage medium according to claim 15, wherein when the computer program is run on the first local terminal, the computer program causes the first local terminal to perform:
receiving a first operation in which a user selects the second local terminal from a plurality of local terminals; and
sending a sharing request to the second local terminal in response to the first operation, wherein the second local terminal sends the third picture to the first local terminal after establishing the direct connection to the first local terminal based on the sharing request.

17. The computer-readable storage medium according to claim 15, wherein when the computer program is run on the first local terminal, the computer program causes the first local terminal to perform:
receiving a sharing request sent by the second local terminal, and establishing the direct connection to the second local terminal based on the sharing request, wherein the second local terminal sends the third picture to the first local terminal after the direct connection is established to the first local terminal.

18. The computer-readable storage medium according to claim 15, wherein:
the first interface further comprises the third picture; or
the first interface does not comprise the third picture.

19. The computer-readable storage medium according to claim 15, wherein:
the first interface further comprises the first picture; or
the first interface does not comprise the first picture.

20. The computer-readable storage medium according to claim 15, wherein when the computer program is run on the first local terminal, the computer program causes the first local terminal to perform:
receiving a second operation in which a user adjusts a parameter of the third picture; and
sending a picture parameter adjustment request to the second local terminal in response to the second operation, wherein the second local terminal sends the third picture to the first local terminal after adjusting the third picture based on the picture parameter adjustment request.

* * * * *